(12) United States Patent
Harris et al.

(10) Patent No.: US 6,752,920 B2
(45) Date of Patent: Jun. 22, 2004

(54) INTEGRAL VALVED FILTER

(76) Inventors: James Jeffrey Harris, 2592 Westridge Dr., Cameron Park, CA (US) 95682; James William Harris, 14080 Berry Rd., Golden, CO (US) 80401

(*) Notice: Subject to any disclaimer, the term of this patent is extended or adjusted under 35 U.S.C. 154(b) by 0 days.

(21) Appl. No.: 10/103,442

(22) Filed: Mar. 21, 2002

(65) Prior Publication Data

US 2003/0178350 A1 Sep. 25, 2003

(51) Int. Cl.[7] .............................................. B01D 35/16
(52) U.S. Cl. ...................... 210/107; 210/108; 210/350; 210/411; 210/414; 210/456
(58) Field of Search ................................ 210/107, 108, 210/487, 488, 134, 346, 333.01, 350, 354, 411, 429, 456, 414

(56) References Cited

U.S. PATENT DOCUMENTS

| | | | |
|---|---|---|---|
| 1,642,864 A | 9/1927 | Williams | |
| 1,643,299 A | 9/1927 | Furness | |
| 1,926,557 A | 9/1933 | Perkins | |
| 2,422,735 A | 6/1947 | La Guardia | |
| 2,847,126 A | 8/1958 | Goodman | |
| 3,195,730 A | 7/1965 | Muller | |
| 3,648,843 A | 3/1972 | Pearson | |
| 3,827,568 A | 8/1974 | Toth et al. | |
| 4,042,504 A | 8/1977 | Drori | |
| 4,045,345 A | 8/1977 | Drori | |
| 4,156,651 A | 5/1979 | Mehoudar | |
| 4,271,018 A | 6/1981 | Drori | |
| 4,295,963 A | 10/1981 | Drori | |
| 4,308,142 A | 12/1981 | Braukmann et al. | |
| 4,402,829 A | 9/1983 | Cordua | |
| 4,410,430 A | 10/1983 | Hagler, Jr. | |
| 4,430,232 A | 2/1984 | Doucet | |
| 4,552,655 A | * 11/1985 | Granot | .............. 210/108 |
| 4,592,839 A | 6/1986 | Rosenberg | |
| 4,655,910 A | 4/1987 | Tabor | |
| 4,655,911 A | 4/1987 | Tabor | |
| 4,707,259 A | 11/1987 | Doucet | |
| 4,714,552 A | 12/1987 | Tabor | |
| 4,726,900 A | 2/1988 | Keskinen et al. | |
| 4,906,357 A | 3/1990 | Drori | |
| 4,906,373 A | 3/1990 | Drori | |
| 4,923,601 A | 5/1990 | Drori | |
| 5,393,423 A | 2/1995 | Drori | |
| 6,318,563 B1 | 11/2001 | Drori | |

* cited by examiner

*Primary Examiner*—Joseph Drodge
*Assistant Examiner*—Terry K. Cecil
(74) *Attorney, Agent, or Firm*—Edwin H. Crabtree; Ramon L. Pizarro; Donald W. Margolis

(57) ABSTRACT

A self cleaning filter includes a body (15), inlet (1), outlet (14), flush inlet (12) and waste outlet (2). Elements (7) provide filtration while compressed but are cleaned decompressed. Feed from inlet port (3), impacts and swirls from an impeller (5) on moveable plunger (6) for preliminary centrifugal separation. During filtration plunger (6) is positioned to open the inlet port (3), the filtrate port (11) and compress filtration elements (7). The swirling feed permeates the filtration elements (7) and passes filtrate port (11), filtrate valve (21), filtrate plenum (16), and exits the filtrate outlet (14). Plunger (6) is moved and cleaning is provided by supplication of pressurized cleaning media to the back flush receiver plenum (13) via the back flush media inlet (12). This pressure motivates plunger(6) to close inlet port (3), filtrate port (14) and decompress filtration elements (7). Multidirectional jets (25) and (26) of cleaning media exits orifices (9) and (10) to flush the filtration elements (7) in an optimal multidirectional fashion. Waste is discharged from waste outlet (2).

18 Claims, 28 Drawing Sheets

INTEGRAL VALVED FILTER

BACKGROUND

1. Field of Invention

This invention relates to a method and apparatus with the focus of providing a more efficient, reliable and cost effective means for the back flushing of filtering mechanisms. Specifically the invention is directed to providing an improved method and apparatus to facilitate high energy, efficient, reliable and most cost effective back flush cleaning of stacked disk filtration mechanisms.

2. Description of Prior Art

Modern industry and agriculture both require filtration technologies of varying capacities. Initially, innovative and higher efficiency filtration technologies evolved primarily out of the industrial market needs with agricultural filtration needs being satisfied by relatively simple and somewhat crude technologies. Concurrent with worldwide agricultural growth, and specifically as a consequence of the development of highly efficient drip tube irrigation technologies, the demand and resultant development of much more efficient, yet cost effective and reliable agricultural filtration processes burgeoned. Indeed, the previous trend of agricultural filtration technologies being primarily low cost derivatives of industrial designs has been superseded by the current industrial interest in employing modern agricultural derived technologies to industry. In many cases adaptation of agricultural based filtration technologies into industrial applications have been positive and straight forward. Other industrial applications however, have encountered problems. These problems are primarily linked to three issues. The first issue being chemical incompatibility between the materials of manufacture of the filtration equipment and the subject fluid and/or entrained components thereof. The second issue being process applications criteria, wherein the usual problems are associated with incompatible pressures and/or flow rates. The third issue relates to mechanical incompatibility of the fluid to be filtered solids concentration or characteristics, wherein the incompatibility relates to excessively high solids concentration and/or the adhesive nature of the solids. The consequence of these challenges being the necessity for a high cleaning cycle frequency. High cleaning cycle frequencies stresse and wears valves and other moving components, thereby invoking high maintenance, operating costs and impaired reliability.

In those applications in which chemical compatibility is an issue, fabrication employing compatible materials may be a technically feasible solution. However, in many such situations there is a high cost associated with either the chemically compatible raw material or the machining, molding, tooling or other fabrication processes necessitated by the compatible material specifications. In these cases, the economic burden associated with these costs must be evaluated on a case by case basis. The resolution of the second and third issues, particularly as they apply to disk filtration technologies, are the primary focus of this invention.

Disk filtration technology has been developed over many decades. There are generally two categories referenced in the art as disk filtration. One such category incorporates the parallel mounting of one or more disks comprised of a screening material encapsulating a substantially hollow platelike structure which is generally mounted on a filtrate conduit. In such art, the filtration process occurs across the disk encapsulating screens wherein the screens may or may not include the provision of a filter aid such as diatomaceus earth. This subcategory of filtration technology has been commonly employed in industry for decades.

The second category of disk filtration has been developed primarily, though not exclusively, through agricultural needs. This category is the primary focus of this invention. This category of the art, embodies the employment of multiple ring-type disks, generally, though not always, made of a plastic material, stacked together to compose a primarily hollow cylindrical assemblage. Unfiltered water is forced under pressure to pass between these disks in a substantially radial direction, typically from the external to the internal side of the stack. Various types of protrusions or surface topology of the disks provide for the catchment of particulate matter suspended in the fluid. The trammeling of particles thereby occurring upon the external surface of the cylindrical assemblage and/or upon the contacting surfaces of the disks. Wherein for clarity, the catchment surface external to the stack is substantially perpendicular to the direction of flow while that of the contacting surfaces is substantially coplanar with the direction of flow. The filtrate exits the disk stack and is ported to process for use.

The geometrical configuration and associated filtration mechanism of the disks as defined in the prior art are diverse. Reference is made to an early disk filter process wherein tapered disks with radially internal filtrate porting was proposed for removal of disperse sizing of particles as demonstrated in U.S. Pat. No. 1,643,299.

Other configurations practiced in the art are delineated in U.S. Pat. Nos. 2,847,126, 3,648,843, 3,827,568, 4,430,232, 4,707,259 and 4,726,900. In these practices perturbations and/or other spacing mechanisms are embodied on the disk surfaces so as to facilitate geometrical spacing between adjacent disks consistent with the required filtration size or grade. In such art the unfiltered water is constrained to pass radially between the disks of the cylindrical assemblage. Particles larger than the disk spacings therefore being trammeled upstream of the constrained fluid path. Various manifestations of this art have been further proposed in which the upstream configuration of the disks is so modified as to provide for a increased upstream surface lineage, thereby providing for an enhanced particle trammeling area. Reference is made to U.S. Pat. No. 4,410,430.

Further lessons of the art demonstrate the employment of surface grooves on one or both sides of the disks for the provision of flow channels between abutted disks. The size and geometry of said channels being the constraint on the passage of particles. Particles of sufficient size and/or geometry are trammeled at the entrance to the groove channels. Reference to these developments of the art are provided in U.S. Pat. Nos. 1,642,864 and 3,195,730.

As is compulsory with filtration processes in general, disk filtration processes require some means of filtration surface cleaning to remove the collected solids separated from the treated fluid. Some examples of the prior art show little discussion of this issue. It can only be assumed that in these cases either disposal or disassembly and manual cleaning must be the procedure of choice. The drawback of the disposal option being the expense of replacement. The disadvantage of the disassembly and cleaning option being the expense of labor and associated downtime.

Prior art has evinced many examples in which the disks are cleaned through mechanical means and/or hydraulic means. Such means being accomplished in automated, semi-automated or manually impelled processes.

An example cited in the prior art of a mechanical means for cleaning, demonstrates a cleaning mechanism wherein the disks are rotated relative to one another providing a scrapping mechanism and thereby facilitating removal of the collected debris. Reference U.S. Pat. No. 1,926,557 as an example of such art. The detriments inherent in this art are the mechanical complexities involved in maintaining the proper relative disk orientations and the rotary mechanisms necessary to facilitate the relative disk rotations. This art also suffers from the detrimental tendency to smear or extrude rather than remove those collected solids which are soft and pliable.

Prior art has demonstrated other mechanical cleaning methods wherein brushes are employed to clean accumulated debris from the outer cylinder assemblage surface. Reference is made to U.S. Pat. No. 2,422,735 relating to such an invention. This example of the art suffers from mechanical complexity, high wear problems and fouling of the brushes.

Prior art has cited many examples of hydraulic cleaning processes. In this embodiment of the art, a washing fluid is directed to flush the collected solids debris from the disk stack. In the simplest form of the art, filtrate is forced to flow in a reverse or back flushing manner through the filter with the aim of dislodging, separating and transporting collected solids from the filter. This solids entrained back flush fluid is then generally ported aside for further processing or discharge.

An agricultural application where such a cleaning process has found common use is in irrigation line pre-filtration systems. In these systems, a plurality of filtration bodies containing disk filter stacks are operated in a parallel manner between a common inlet manifold and a common outlet manifold. In such configurations, pressurized, unfiltered irrigation water passes from the inlet manifold through the filters, where the solids are collected, and enters into the slightly less pressured outlet manifold as filtrate. The hydraulic design of the irrigation and filtration system is so constrained as to sustain a sufficiently pressurized outlet manifold when flow from one of the filter bodies is eliminated and flow from the others is slightly reduced. An embodiment wherein the pressurized filtrate from the outlet manifold is employed for back flushing of the filters is a consequence of such a hydraulic design. In this design the inlet to a chosen filtration body is diverted by valving means from communication with the inlet manifold to communication with a waste back flush manifold. The pressure in the waste back flush manifold is maintained at a level substantially lower than that of the outlet manifold. As a consequence of this pressure gradient, filtrate from the outlet manifold flows in a reverse manner through the chosen filter body and associated disk filter stack into the waste back flush manifold. Solids collected on the filter stack surfaces are dislodged and conveyed into the waste back flush manifold for eventual discharge. Subsequent to cleaning, the filter is brought back into the filtration mode by means of valved restoration of communication to the inlet manifold and isolation from the waste back flush manifold. The filtration system cleaning process then continues with sequential repetition of similar back flushing operations on the remaining filter bodies in the system. This embodiment of the art has historically found abundant applications though it suffers substantially from inherent inadequacies in cleaning efficiency of the disk filtration apparatus. These inadequacies result from channeling of back flush fluid through the disk stacks and reverse flow fluid velocities which are insufficient to adequately dislodge solids adhered to the filtration surfaces. As a result, such embodiments have proven to be labor intensive with excessive maintenance associated with periodic manual cleaning of the filtration disk stacks. Further, the required valving, controls and associated complexities are costly and prone to failure. Failures are particularly troublesome when the cleaning cycle frequency is high, a common result of incomplete cleaning of the disks.

In response to the inadequacies of the simple reverse flow back flushing process, further developments of the art have been cited. To reduce channeling effects and to mechanically assist in dislodging solids adhered to the filtration surfaces several embodiments of the art have been cited wherein the filter disk cylindrical assemblage is opened. In such an action the compression force, which normally holds the disks tightly together to facilitate filtration operation, is removed in such a fashion that the disk stack is substantially opened and the filtration disks rendered free floating. Filtrate is then directed through the open disk stack to flush the collected solids debris from the opened and now accessible filtration surfaces. Upon completion of flushing, the disks are brought back together in compression and filtration resumes. Reference is made to U.S. Pat. Nos. 4,156,651, 4,402,829, 4,592,839 and 4,714,552 for examples cited to this art. These developments, though somewhat successful in improving the cleaning efficiency of the disks, still suffer from inadequate velocities in flushing of the solids laden surfaces of the disks. In most cases the increased mechanical complexity necessary to facilitate decompression of the disks, does not justify the relatively small improvement of cleaning efficiency of the opened disk stack.

In response to the inferior cleaning performance associated with inadequate back flushing velocity, further developments of the art have been advanced. Developments have been cited in which the total back flush flow is delivered in the form of one or more high velocity flows focused over relatively small areas of the filtration disk surfaces. As a consequence of the limited area of focused flushing, the high velocity flows and/or the cylindrical disk stack are mechanically maneuvered, relative to each other, so as to facilitate cleaning of the entire filtration surface.

In several of these embodiments the enhanced velocity, focused back flushing flow is generated by a drafting or suction type of action across the filtration surfaces. To facilitate this action the filter environs, comprising a housing and the associated enclosed disk stack, are maintained at a pressure elevated above that of an external waste back flush fluid manifold. A hollow, open ended conduit tube or slot, which is in hydraulic communication with the waste back flush manifold, is perpendicularly juxtaposed against a relatively small, upstream area of the filter disk stack. In response to the pressure differential between the fluids constrained within the filter environs and the conduit tube, a converging fluid flow is induced past and through a relatively small and focused area of the disk stack and into the open end or slot of the conduit. This induced, relatively high velocity flow dislodges, cleans and conveys collected solid debris from the disk filtration surfaces to the waste back flush manifold for further processing or discharge. As a consequence of the limited area of focused flushing, the open end or slot of the conduit tube and/or the cylindrical disk stack are mechanically maneuvered, relative to each other, so as to facilitate cleaning of the entire filtration surface. Such embodiments have been cited to also include mechanisms for decompression of the disk stack. This action, as was previously recited for prior art, promotes access to the disk filtration surfaces to ameliorate the cleaning process. Examples delineating these lessons of the art are referenced as U.S. Pat. Nos. 4,042,504, 4,045,345, 4,271, 018, 4,295,963, 4,906,373 and 4,923,601. A disadvantage associated with this example of the art is the volume of waste back flush fluid generated. The drafting action generates a convergence of flow from the filter environs. A portion of this fluid does not adequately contact the filtration surfaces to provide effective flushing. As a result, there is excess fluid loss in the waste back flush volume. Further detriments relate to complexities in the mechanics of the relative maneuvering of the filter disk stack and the open end or slot of the conduit. Such assemblages are costly in fabrication and are prone to leakage, wear, corrosion and mechanical failure.

Other embodiments have been cited in which the total back flush flow is delivered in the form of one or more enhanced velocity flows presented as pressurized jets focused over relatively small areas of the filtration disk surfaces. The cited embodiments have professed the high velocity jets in several formats, one being where high pressure flushing fluid is delivered from external of the filter to one or more movable jetting nozzles via an extendable and rotatable conduit. In such embodiments, the filtration flow is typically in the direction of radially external to internal of the cylindrical disk stack. The jet nozzles are located within the hollow center of the stack and are so oriented as to facilitate a jetting direction radially outwards through the stack. Axial extraction of the conduit and attached nozzles through the disk stack while concurrently rotating the jetting nozzles about a plane coplanar with the disks, facilitates full flushing of the disk stack. Such embodiments have been cited to also include mechanisms for decompression of the disk stack. This action, as was previously recited for the prior art, promotes access to the disk filtration surfaces to ameliorate the cleaning process. Examples of such embodiments can be referenced as U.S. Pat. Nos. 4,308,142, 4,655,910, 4,655,911, 4,906,357, 5,393,423 and 6,318,563. Problems inherent to these embodiments of the art relate to the mechanical complexities associated with maneuvering of the back flush conduits, nozzles and ancillary valves. Further, such equipment is costly as well as being prone to leakage, wear, corrosion and mechanical failure.

Another cited format of the embodiment of localized, high velocity jets employs the delivery of high pressure flushing fluid from external of the filter to a full circle nozzle assembly via an extendable conduit tube. In such an embodiment the back flush jet is presented as a relatively thin planar jet impacting in a radial format upon the disk stack. To facilitate full coverage of the disk stack during the flushing operation, the circular nozzle assembly and associated conduit are extracted axially through the stack concurrent with full circle, radial jetting of the back flush fluid through the disks. Such embodiments have been cited to also include mechanisms for decompression of the disk stack. This action, as was previously recited for the prior art, promotes access to the disk filtration surfaces to ameliorate the cleaning process. Reference is made to U.S. Pat. No. 4,156,651. Problems inherent to this form of the art are similar to those of the foregoing rotating jet nozzle embodiment. The primary deterrent being the mechanical complexities associated with the moving back flush fluid conduits, nozzle and ancillary valves. Such equipment is costly as well as being prone to leakage, wear, corrosion and mechanical failure.

A further embodiment of the art exhibits the flushing efficiency of the pressurized jet approach but eliminates the mechanical complexities associated with the movement thereof. In this development the filter disks circumscribe several hollow shaft like elements. These shafts are oriented in the axial direction of the disk stack and provide the lateral support necessary to maintain the cylindrical configuration of the stack. Oriented on one or more of these shafts is a series of unidirectional nozzle-like holes providing hydraulic communication between the hollow interior and the exterior of the shafts. The hollow section of these shafts provide a conduit for reverse flow of filtrate. The nozzles provide the discharge means to jet the reverse flowing filtrate against the disks for back flush cleaning. These nozzle-holes are unidirectional on each tube and are located adjacent to, but in a somewhat tangential manner, to the internal surface of the disk stack. Said tangential orientation being similar so as to provide a vigorous rotational impetus to the disks. The upper ends of the shafts support a disk compression assembly. This assembly maintains closure pressure on the disk stack during filtration but moves in an axial direction away from the disk stack to release and open the disks for enhanced cleaning during back flushing. The lower ends of the shafts terminate in a support base in such a manner that the hollow of the shafts is in hydraulic communication with the filtrate porting of the disk stack. Included and imperative to the operation of the cited embodiment is a check valve assembly hydraulically located intermediate between the filtrate port from the disk stack and the open lower ends of the hollow shafts. This check valve is critical in providing the diversionary means necessary to direct the reverse filtrate flow into the hollow shaft elements and associated nozzles rather than into the internal volume of the disk stack. This check valve assembly has been cited as an annular type of one way diaphragm check as well as a collapsible, rubber sleeve type of one way valve. In practice a solid, spring loaded type of check valve as well as a conical rubber-like flapper check valve have also been employed. Reference is made to U.S. Pat. Nos. 4,655,910 and 4,655,911. In operation, this embodiment also requires inlet valving external to the filter to provide stoppage of feed water to the inlet during back flushing operation. The performance of this embodiment of the art shows improvement over the previous lessons of the art albeit, still with some substantial disadvantages.

One such disadvantage of this embodiment of the prior art relates to the fabrication and maintenance expenses and as well as reliability problems associated with the mechanical and hydraulic deficiencies of the check valve and the inlet valve. These valves are costly and prone to wear, corrosion and leakage. Further, the inlet valve, being an external accessory to the filter, requires additional means for actuation and control. These additional requirements add to the capital cost and complexity while decreasing the reliability of the filter device.

A further disadvantage related to the check and inlet valves results from the high pressure drop experienced by fluids passing through such contrivances. As a consequence of this pressure drop, either the flow rate is reduced or higher pumping pressures must be employed. Reduced flow rate impedes upon the usefulness of the apparatus. Higher pumping pressures require more energy consumption and larger, more expensive pumping equipment.

A further disadvantage, manifest as a malfunction of the inlet valve, occurs as a consequence of inlet debris becoming ensnared in the valve assembly. Malfunction of this valve renders the filtration process inoperable. Consequently, downtime, labor and associated expenses must be employed for manual disassembly, cleaning and/or repair and of the valve and piping assemblies An additional problem associated in this embodiment of the prior art results from the excess rotational velocity imparted to the disk stack by the similarly oriented nozzles. This high rotational speed reduces the relative impact velocity of the jets upon the disk surfaces, thereby undermining the jet scouring action across the disks. As a consequence, the cleaning efficiency is impaired.

A further problem resulting from the similar orientation of the jets corresponds to the angle of impact of the jets upon the spinning disks. The impact patterns of all the jets upon the disk surfaces are similar. Solids adhering to surfaces must often be struck from varying directions to be loosened. The similar orientations of the nozzles and resulting jets of this embodiment do not effectively provide the varying orientations of impact necessary for dislodging and removing solids adhered to the disk filtration surfaces. As a result, the similar orientation of the nozzles in this embodiment of the prior art often does not provide for adequate cleaning of the filtration disks. This difficulty providing further degradation in industrial applications involving adhering solids A further detriment of this embodiment of practice results from a hydraulic imbalance across the disk stack. The feed water inlet and the filtrate water outlet are on the same end of the filter disk stack thereby producing a hydraulic imbalance. This imbalance results in preferential flow through the inlet/outlet end of the disk stack instead of a balanced flow across the disk stack in it's entirety. The result is high solids loading on the inlet/outlet end of the disk stack and a light solids loading on the opposite end of the disk stack. The problem associated with such a loading pattern is the proclivity for the inlet/outlet end of the disk stack to becoming overly impacted with solids. As a consequence of such impaction, the disks cannot be effectively flushed clean. Eventually, the filtration efficiency deteriorates and the disk stack must be disassembled for manual cleaning. This is inefficient, labor intensive and costly.

This embodiment of the art has seen some commercial success in agricultural practices. The potential advantages of the design have attracted industrial interest and have resulted in a few industrial applications. Problems have been encountered in the industrial applications that have not been experienced in the agricultural applications. One of the major problems encountered is the inability to adequately flush the filtration disks clean when filtering waters entrained with oils, greases, waxes and other organic solids common to industrial processes. These materials have a proclivity toward adherence onto the disk filtration surfaces.

Experience has shown that the back flush cleaning efficiency of the filtration disks is directly related to the back flushing pressure. In those industrial applications in which, the adhesion of solids to the disks is severe, a high pressure is necessary to adequately clean the disk filtration surfaces. Additionally it has been found that the employment of certain chemicals to the back flushing fluid can substantially improve the disk cleaning efficiency.

A disadvantage of the prior art relates to the employment of outlet manifold filtrate for back flushing operation. Often, particularly in industry, the filtrate manifold pressure is inadequate to provide efficient hydraulic jetting of the filtrate upon the disks. As a consequence, the disks are ineffectively cleaned. Industry has responded to this shortcoming through the employment of an outside, higher pressure flushing source. In this presentation of the art, an external valve, similar to that typically employed on the inlet side of the filter, is installed between the filtrate outlet of the filter and the filtrate manifold. During the back flushing process, this valve is closed and the high pressure back flushing fluid is introduced between the valve stoppage point and the filtrate outlet of the filter. The filter then is back flushed in the normal procedure with this higher pressure fluid.

There are several disadvantages associated with this embodiment of the art. There is an increase in the capital cost of the filtration system corresponding to the cost of the outlet valve as added between the filtrate manifold and the filter. This valve requires actuation and control thereby exacting additional equipment expense. Further, the added complexities associated with this valve, actuation equipment and control, reduces the overall reliability of the system and imbues additional maintenance requirements and associated expenses. Further, a detrimental filtrate pressure drop is associated with flowing through this outlet valved configuration. Consequently, compensation with higher pressure, more expensive pumps is required.

A further disadvantage of the prior art relates to the mechanical integrity of the check valve assembly. Often the pressure required to generate acceptable flushing of the filtration disks is in excess of the pressure rating of the check valve or associated assemblies. The back flushing pressure therefore must be kept below this level. This mechanically acceptable pressure level is insufficient to adequately flush the filtration disks clean. Accordingly, solids adhere to the filtration disks and eventually must be manually disassembled and cleaned. This is inefficient, labor intensive and costly.

A further disadvantage in the prior art relates to the sensitivity of the check valve assembly to chemicals beneficial to assist in cleaning of the filtration disks. Often materials adhere to the disks to such a degree that chemicals must be employed occasionally or at a low level during each flush to dislodge the adhering solids and facilitate efficient flush cleaning. These chemical are often sufficiently aggressive to damage the check valve assembly thereby rendering the back flushing operation of the prior art inoperable.

A further disadvantage in the prior art relates to the sensitivity of the inlet valve assembly to chemicals beneficial to assist in cleaning of the filtration disks In those situations where solids adherence to the filtration disks requires flushing with aggressive chemicals for effective cleaning, the inlet valving is prone to damage or destruction thereby rendering the filtration/back flush operation nonfunctioning.

An additional problem is associated with damage to the outlet valve when aggressive disk cleaning chemicals are employed in combination with external high pressure flushing for cleaning of the filtration disks. In those situations where solids adherence to the filtration disks require cleaning with high pressure and aggressive chemicals, the outlet valve is prone to chemically induced damage or destruction. Failure of this valve renders the external source back flushing operation ineffective thereby resulting in poor, unreliable filtration system performance with associated downtime, maintenance and labor expenses.

It has been found that disk filtration processes may be enhanced under certain unfiltered water constituent conditions, by the impartation of a spin or rotation of the unfiltered water as it enters the filter housings. This rotation is oriented substantially in a manner of circulation about the axial direction of the filtration disk stack. For further clarity, the incoming unfiltered water rotates about the cylindrical disk stack in a fashion such that the circle of rotation is substantially coplanar with the filter disk surfaces. The spin primarily imparts some centrugal separation of heavy elements such as sand. The spin also aids in the prevention of plating and blinding of the disk stack external surface by light planar elements such as leaves and film type materials. The practice of art has employed tangential entry and axial vanes to impart the spin.

A detriment to the incitement of the art in which tangential entry is employed to provide a spin impetus to the unfiltered water, is associated with the required offset between the filter body and the inlet centerline. This offset complicates piping and results in higher fabrication costs. Further, because of geometrical factors, a filtration system employing tangential entry requires an overall increase in physical size. Generally industrial space is limited. Therefore, the excess space required by tangential entry filtration systems manifests a substantial disadvantage.

Axial vane-type entry provides for centerline orientation, however, problems associated with debris wrapping about the vanes are common. This is a further disadvantage for those examples of the prior art in which the heavily solids laden back flush waters must pass through the vane assembly while being conveyed to discharge. Debris in the back flush fluid tends to entwine about and/or plug within the vane assemblies thereby impeding flow. Inefficient and expensive manual labor and associated downtime are required to disassemble and remove the entwined debris.

Objects and Advantages

The goal of this invention is to provide resolution of fundamental deficiencies inherent in the prior art which particularly affects the exploitation of disk filtration processes in industry. Further, as an attendant benefit, the invention will provide an improved disk filtration process for agricultural applications.

An object of this invention is to afford a means to eliminate the fabrication expense, mechanical complexity and operational liabilities associated with the critical check valve assemblies of the prior art. The check valve is an essential component of the prior art. An additional object of the invention is to eliminate the pressure drop and/or associated flow impediment accompanying said check valve assemblies. The advantages provided by the invention in achieving these objectives are substantially reduced capital and operating expenses as well as the provision for maximum flow capacity at minimal pumping expense.

An further object and intent of the invention is to provide a means to eliminate the fabrication expense, mechanical complexity and operational liabilities associated with the inlet valve of the prior art. The inlet valve is an essential component of the prior art. An additional object of the invention is to obviate the pressure drop and/or associated flow impediment accompanying the inlet valve apparatus of the prior art. The advantages associated with the obtainment of these objects are substantially reduced capital and operating expenses as well as the provision for maximum flow capacity at minimal pumping expense.

A further object of the invention is to eliminate filtration system failures resulting from plugging and wedging of debris in the inlet valve assemblies of the prior art. The attainment of this object, which provides a substantial advantage over the prior art, eliminates the downtime, labor and expenses associated with maintenance and repair of the inlet valve assemblies. An additional advantage is the provision of utilizing disk filtration art to those debris laden fluids which would otherwise provoke plugging, wedging and failure of inlet valves of the prior art.

An further object and intent of the invention is to provide a means to eliminate the fabrication expense, mechanical complexity and operational liabilities associated with the outlet valves associated with external source back flush embodiments of the prior art. The outlet valve is an essential component of these embodiments of the prior art. An additional object of the invention is to obviate the pressure drop and/or associated flow impediment accompanying the outlet valve apparatus of the prior art. The advantages associated with the obtainment of these objects are substantially reduced capital and operating expenses as well as the provision for maximum flow capacity at minimal pumping expense.

A further object of the invention is the provision of a means to maximize the relative back flush jetting velocity as impacted upon the disks for cleaning. In the prior art, as a consequence of the back flush jets being oriented in the same fashion, the disk surfaces move rapidly away from the back flush nozzles. Indeed, the filtration surface velocity approaches the same velocity as the jets themselves, thereby reducing the relative impact velocity and accordingly, substantially reducing the cleaning effectiveness. The invention has the advantage of providing relatively slow passage of the disk surfaces through the back flush cleaning jets. This aspect of the invention effectuates a substantially higher relative contacting velocity and as a consequence superior cleaning of the disk filtration surfaces.

A further object of the invention is to provide a means to enhance the disk cleaning efficiency of back flush jets. The intent of this object being promoted through variation of impact directions of the back flush jets upon the disk surfaces during cleaning. This advantageous effect of the invention being to promote the release of adhering solids by means of hydraulic impact from differing angles. The benefit being of a substantially improved disk back flush cleaning operation.

A further object of the invention being to fulfill the need for balanced filtration flow across the filtration disk stack. The invention achieves this object with advantages given toward uniform distribution of flow and homogenous solids collection throughout the disk stack. The invention eliminates the disadvantage of the prior art wherein localized heavy deposits of solids collect upon the filtration stack. The invention provides the fruition of balanced filtration loading thereby purveying maximum flow rates at minimal pressures with optimal back flush cleaning performance.

A further object of the invention is to present an embodiment in which sufficiently high back flushing pressures are accessible to promote efficient flushing of the filtration disks regardless of the outlet manifold pressure. An advantageous benefit obtained by the invention in achieving this object is the provision of flexibility and reliability to both low pressure and fluctuating pressure discharge applications. This advantage is of particular significance in those filtration applications in which high pressure back flushing is critical for successful cleaning operations.

A further object of the invention is to present an embodiment of the art in which sufficiently high back flushing pressures can be employed to secure efficient back flush cleaning of the filtration disks without concern relating to the mechanical strength and structural integrity of critical check valves or related assemblies of the prior art. The elimination of the check valve in the invention provides the advantage of permitting the use of high pressure back flushing, as needed, without the risk of pressure induced failure.

An additional object of the invention is to provide a disk filtration apparatus in which chemicals may be employed to assist in back flush cleaning operations without concern of damage to, or malfunction of, the critical check valve assemblies of the prior art. The invention purveys an embodiment in which check valves are not employed. The invention thereby provides the advantage of acceding the use of aggressive, yet beneficial chemicals to assist in disk cleaning operations without endangering critical assemblies of the invention.

An additional object of the invention is to provide a disk filtration apparatus in which cleaning chemicals, which would otherwise damage the inlet valve of the prior art may be safely employed to assist in back flush cleaning operations. The invention provides an embodiment with the advantage that the chemically sensitive inlet valve of the prior art is not present, thereby permitting the employment of aggressive, but otherwise beneficial, chemicals for assistance in filtration disk cleaning operations.

A further object for the invention is to provide a means to foster a spin into inlet unfiltered water about the axis of the disk stack while maintaining the piping ease of centerline piping configuration. By means of a novel centrifugal impact impeller design, a spin rotation about the disk filtration stack axis is imparted unto the water as it enters via the centerline direction of the filter housing. The design promotes the solids separation advantage of imparted spin without hindering the simplicity, low cost and compact size provided by centerline piping.

A further object of the invention is to provide a means for fostering axially oriented spin into the centerline directed unfiltered inlet water as it enters the filter housing without the impediment of axial vanes prone to plugging. The invention employs a novel centrifugal impact impeller rather the axial flow vanes of the prior art to incite the desired rotation of the unfiltered inlet water. The centrifugal vanes of said impeller are constrained within the inlet water stream in such a fashion as to be self cleaning in the flow direction of the inlet stream. Solids entrained back flush fluids are constrained to flow annularly around rather than through the centrifugal spin incitement vanes. The invention thereby provides the advantage of rendering spin to the incoming unfiltered water stream in a manner which eliminates the vulnerability of the spin incitement blades becoming entwined or plugged with inlet or back flushed solids.

REFERENCE NUMERALS IN THE DRAWING

Figure 1:
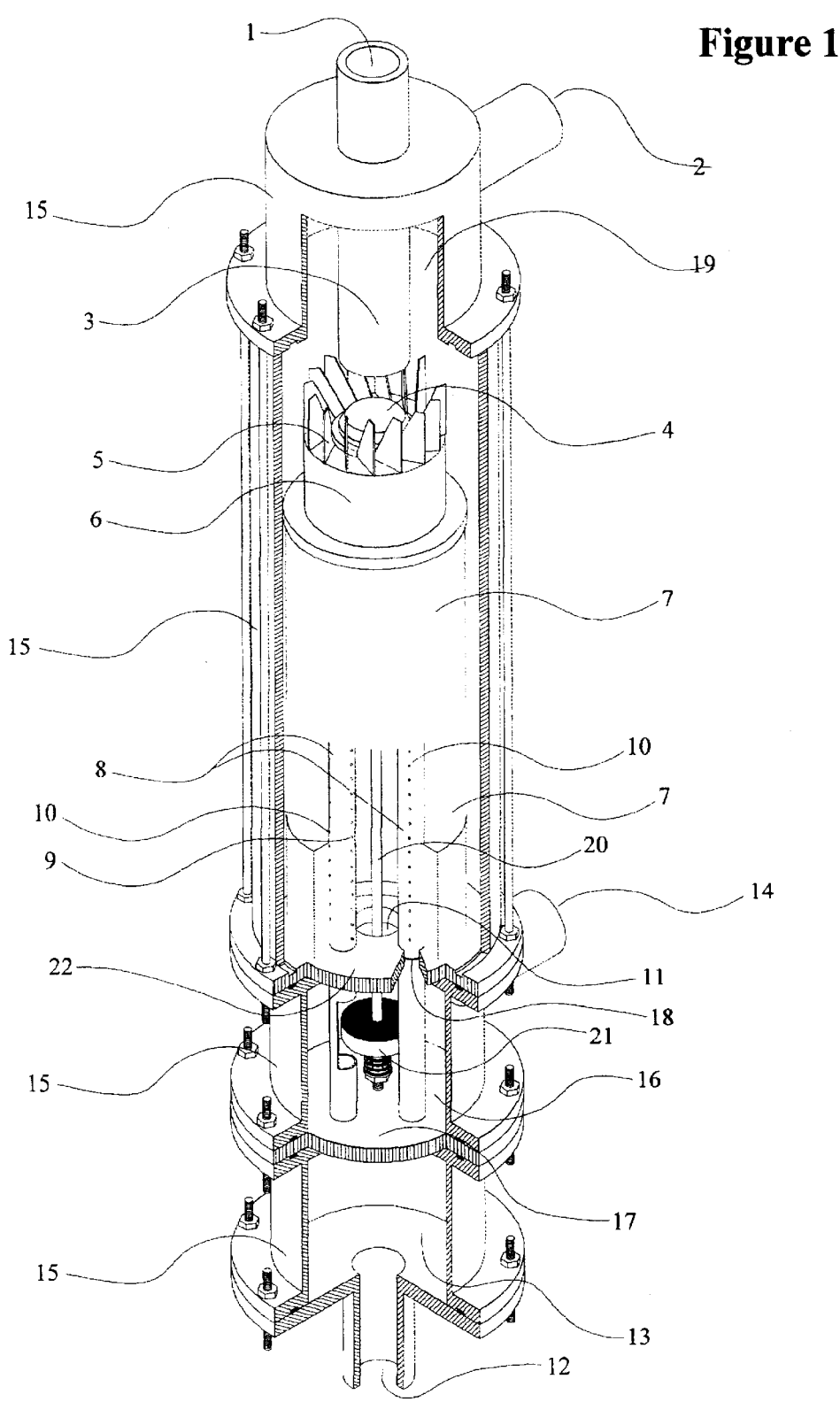
FIG. 1 is a top perspective view of the preferred embodiment operating in the filtration mode. This figure illustrates the employment of the moveable plunger assembly wherein the moveable plunger is positioned to afford inlet flow, disk sealing and compression and filtrate porting from the downstream interior side of the disk stack. Also illustrated in this figure is the centrifugal impact diffuser configuration incorporated to incite inlet rotation. The shown embodiment subsumes wash orifice sets on tubular support members each set consisting of equal sized, coplanar, non-parallel though primarily opposing orifice.

1 Unfiltered fluid inlet
2 Outlet for waste

3 Inlet port
4 Plunger valve seat
5 Centrifugal inlet impeller
6 Moveable plunger
7 Disk filtration element set
8 Tubular support members
9 Right hand rotation oriented member of orifice set
10 Left hand rotation oriented member of orifice set
11 Disk filtration stack filtrate port
12 Back flush receiver inlet
13 Back flush receiver plenum
14 Filtrate product outlet
15 Filter body
16 Filtrate plenum
17 Tubular support base
18 Seal
19 Back flush discharge plenum
20 Connecting shaft
21 Filtrate valve assembly
22 Disk filter stack support base
23 Right hand rotation oriented, low flow member of orifice set
23a Right hand rotation oriented, low flow member of spray set
24 Left hand rotation oriented, high flow member of orifice set
24a Left hand rotation oriented, high flow member of spray set

BRIEF SUMMARY OF THE INVENTION

The intent of this patent is to describe a filtration apparatus wherein, through the inclusion of a unique, hydraulically isolated back flush fluid receiver plenum, the troublesome, performance impeding and costly check valve apparatus, a critical component of the prior art, is eliminated. In addition, through the novel integral combination of an inlet port, outlet port and disk stack sealingplunger assembly, the troublesome, performance impeding and costly inlet and outlet valves, commonly employed in the prior art, are also eliminated. Further, superior back flushing performance is provided through the novel separation of back flushing spray jets into a plurality of spray sets, each set comprised of two individual spray jets oriented in substantially opposing directions upon the inside surface of the filtration element disks. This unique orientation provides superior cleaning performance. Part of this benefit results from a wide spectrum of impact angles afforded the jets in scouring across the disk surfaces. An additional benefit results from a reduction in the spray induced disk rotational speed. Wherein the reduced rotational speed affords higher relative contact velocities between the disks and the jets, thereby enhancing the cleaning efficacy of the jets.

The invention provides additional performance enhancement through the inclusion of a novel, open vaned, centrifugal type of impact impeller encompassing the inlet port sealing area of the inlet port and sealing plunger. This impeller imparts a swirling, cyclonic action onto the incoming, unfiltered fluid. This action enhances solids separation through centrifugal means. The open vane configuration eliminates the risk of plugging or entwinement of solid or fibrous debris about the vanes. Further, the unique location of the impeller, being both centerline to the filter as well as in the back flush shadow of the inlet port and sealing plunger, places it within the inlet flow stream but protected from the very high solids laden back flush outlet flow stream. Advantages being abrogation of impediments to back flush flow, elimination of entwinement and facilitating less expensive and geometrically compact centerline piping and fabrication.

Summarily, in accordance with the foregoing and other broad aspects of the invention, there is provided by the discussions of this patent an industrial grade filtration device to which a supply line conveying unfiltered fluid is connected. Further, there is a lower pressure discharge line conveying filtrate from the device to process, an intermittently charged high pressure line conveying a back flush washing fluid to the device and a low pressure waste discharge line conveying the filtration product debris and associated spent back flush washing fluid from the device. The filtration device is contained within a multi sectional body to which the conveyance lines are adapted.

Sectional components on the downstream end of the body assembly consist of a back flush receiving plenum which adapts to the high pressure back flush conveyance lines and a filtrate plenum which adapts to the outlet filtrate conveyance line. Sectional components on the upstream end consist of the body encompassing an inlet port member and a back flush discharge plenum. Said inlet port being engendered with a valve seat on the downstream end and adapted to the unfiltered fluid supply conveyance line on the upstream end. Said back flush discharge plenum adapting to the low pressure waste discharge conveyance line. The medial section of the body accommodates a cylindrical filtration element, which in the preferred embodiment, is comprised of a stack of filtration disks. Said disks being disposed as a hollow cylindrical assemblage circumscribed about multiple structural support tubes. Wherein these tubes terminate in a sealing plunger assembly on the upstream end of the tubes, penetrate, in a sealing fashion, through a disk support base on the downstream side of the disk stack and are rigidly fixed to and penetrate a structural base on the downstream end of the tubes. Said structural base further providing service in hydraulically separating a back flush receiving plenum from a filtrate plenum. Said tubes being of a hollow configuration thereby further providing hydraulic communication between the back flush receiving plenum and the internals of the sealing plunger.

Wherein said sealing plunger is so configured as to facilitate disk sealing and compression on the downstream side and inlet port sealing on the upstream side. Said sealing plunger being further configured to be in mechanical communication via a shaft or similar device with a filtrate valve assembly located in communication with the downstream side of the filtrate discharge port in the disk support base. Said sealing plunger being mechanically supported by the upstream end of the tubular supports and so assembled as to permit axial motion in the upstream and downstream directions contingent upon hydraulic pressure application internal to the sealing plunger as provided through hydraulic communication with the hollows of the tubular supports and the back flush receiving plenum. Wherein the tubular support members are further provided with a plurality of two direction orifice sets with each set, capable of providing, during back flushing operations, two nearly opposing cleaning jets of fluid. These jets being generated by the hydraulic pressure within the tubular supports and oriented onto the disk surfaces. Thereby during back flush proceedings, external pressure is supplied to the back flush receiving plenum, pressurizing the tubular support members, motivating the sealing plunger upstream so as to release the filtration disks, seal the filtrate outlet, seal the raw feed inlet and generate washing sprays upon the disks wherein the removed waste is discharged from the device via the waste port. Removal of pressure from the back flush receiving plenum releases the sealing plunger to move downstream to bring the filtration disks into the sealed and compressed filtration configuration while concurrently open the inlet port and the disk filtrate outlet port to supply raw feed water and provide filtrate to process.

Further features and advantages of the invention will be apparent to those knowledgeable in the art by reference to the illustrations and associated elucidations supporting seven embodiments of the art as follows.

Figure 2:
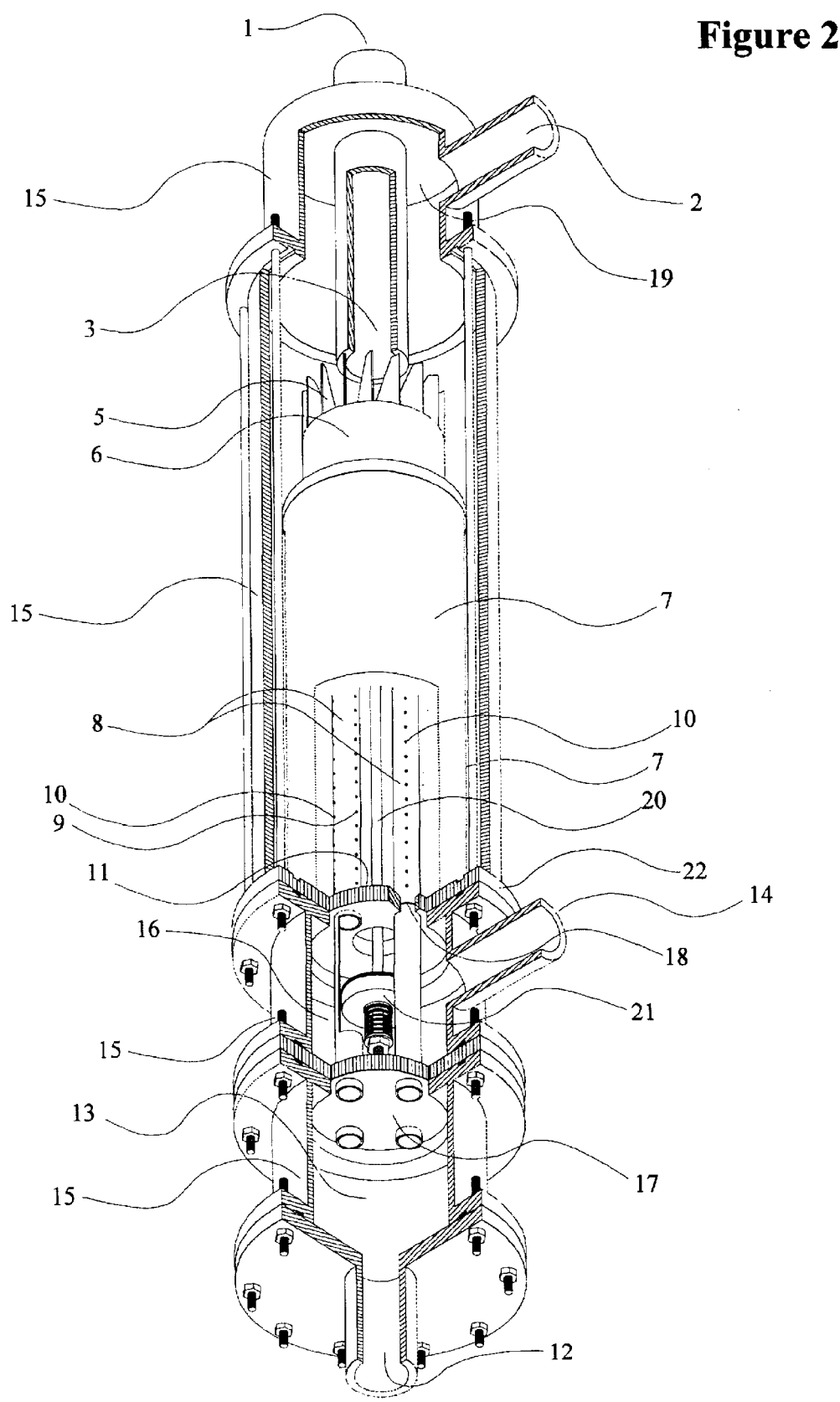
FIG. 2 is a bottom perspective view of the preferred embodiment operating in the filtration mode. This figure illustrates the employment of the moveable plunger assembly wherein the moveable plunger is positioned to afford inlet flow, disk sealing and compression and filtrate porting from the downstream interior side of the disk stack. Also illustrated in this figure is the centrifugal impact diffuser configuration incorporated to incite inlet rotation. The shown embodiment subsumes wash orifice sets on tubular support members each set consisting of equal sized, coplanar, non-parallel though primarily opposing orifice.

DETAILED DESCRIPTION OF THE DRAWINGS
Description—FIGS. 1 and 2

Direct to obtaining the effect of the invention a preferred embodiment, operating in the filtration mode, is illustrated in perspective on FIG. 1 as an inclined to the upstream view and FIG. 2 as an inclined to the downstream view. Operational definition of the preferred embodiment is as follows.

Unfiltered fluid is introduced under pressure into the filter body 15 via the inlet 1 of the invention. The unfiltered fluid travels through the inlet port 3 and discharges from the valve seat receiver end of the inlet port 3 onto the inlet valve seat area 4 located on top of the sealing plunger 6. The unfiltered fluid impacts against the inlet valve seat area 4 and is impelled by the impact radially outward acquiring a swirl while passing through the turning vanes of the centrifugal inlet impeller 5.

The swirling, unfiltered fluid passes through the annular space between the filter body 15 and the external surface of the filtration disks 7 stack. The upstream end of the filtration disks 7 stack is sealed by the backside of the moveable plunger 6 being in the opened inlet, filtration mode position. The downstream end of the filtration disks 7 stack is sealed by the disk support base 22. The fluid passes between the filtration disks 7 of the stack and accedes to the internal volume of the filtration disks 7 stack as a filtrate. The filtrate exits the disks 7 via the filtrate discharge port 11 adjacent to the connecting shaft 20, past the open discharge valve 21 and enters the filtrate plenum 19 for conveyance via the filtrate discharge outlet 14 to process.

Figure 3:
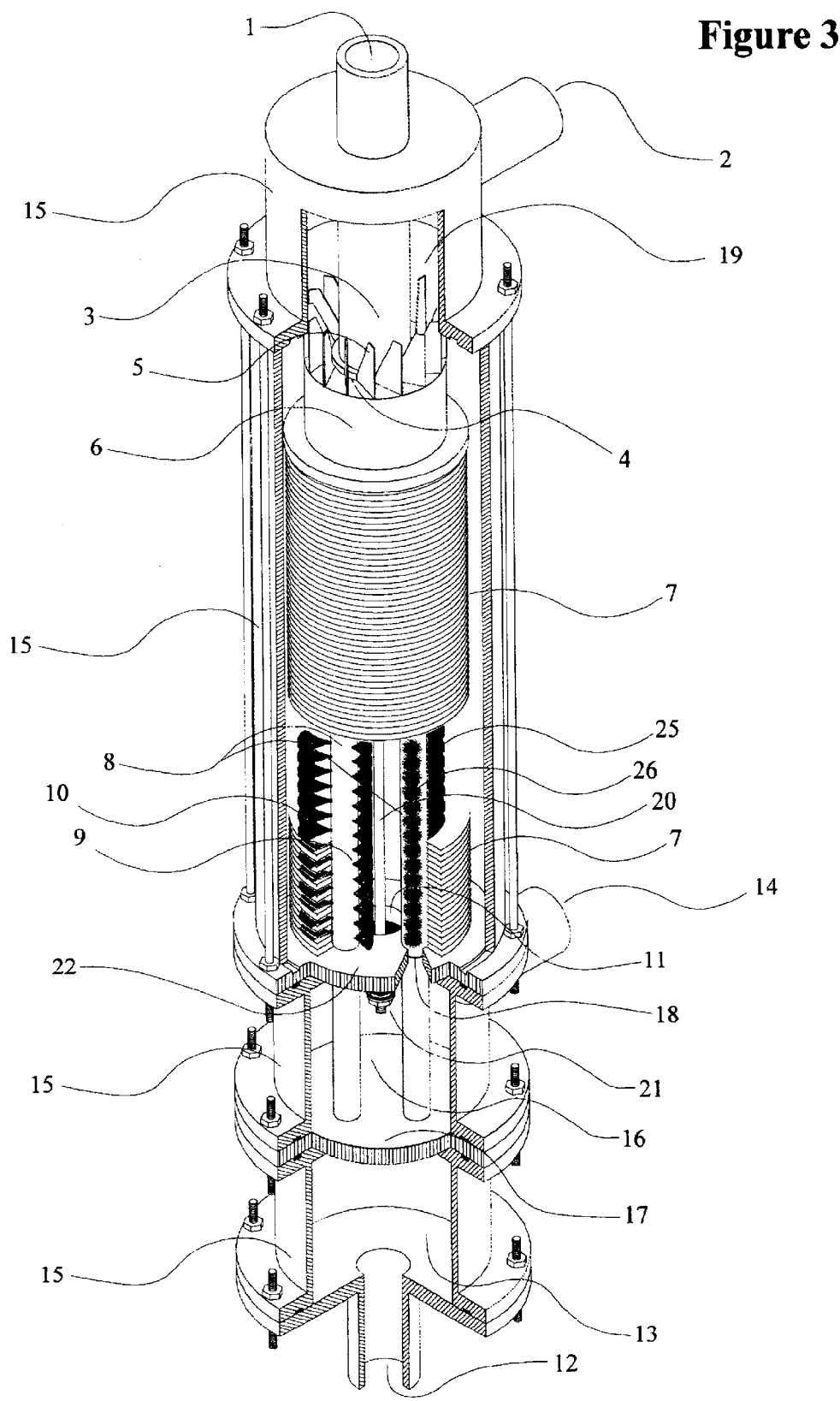
FIG. 3 is a top perspective view of the preferred embodiment operating in the back flushing mode wherein high pressure back flushing fluid is introduced into the back flush receiver inlet on the downstream end of the filter. This figure illustrates the employment of the pressurized moveable plunger assembly wherein the moveable plunger is driven to impede inlet flow, decompress the filtration disks and impede flow through the filtrate port located on the downstream interior side of the disk stack. Also illustrated in this figure is the centrifugal impact diffuser configuration incorporated to incite inlet rotation. The shown embodiment subsumes wash jet sets on tubular support members each set consisting of equal sized, coplanar, non-parallel though primarily opposing jets.
Figure 4:
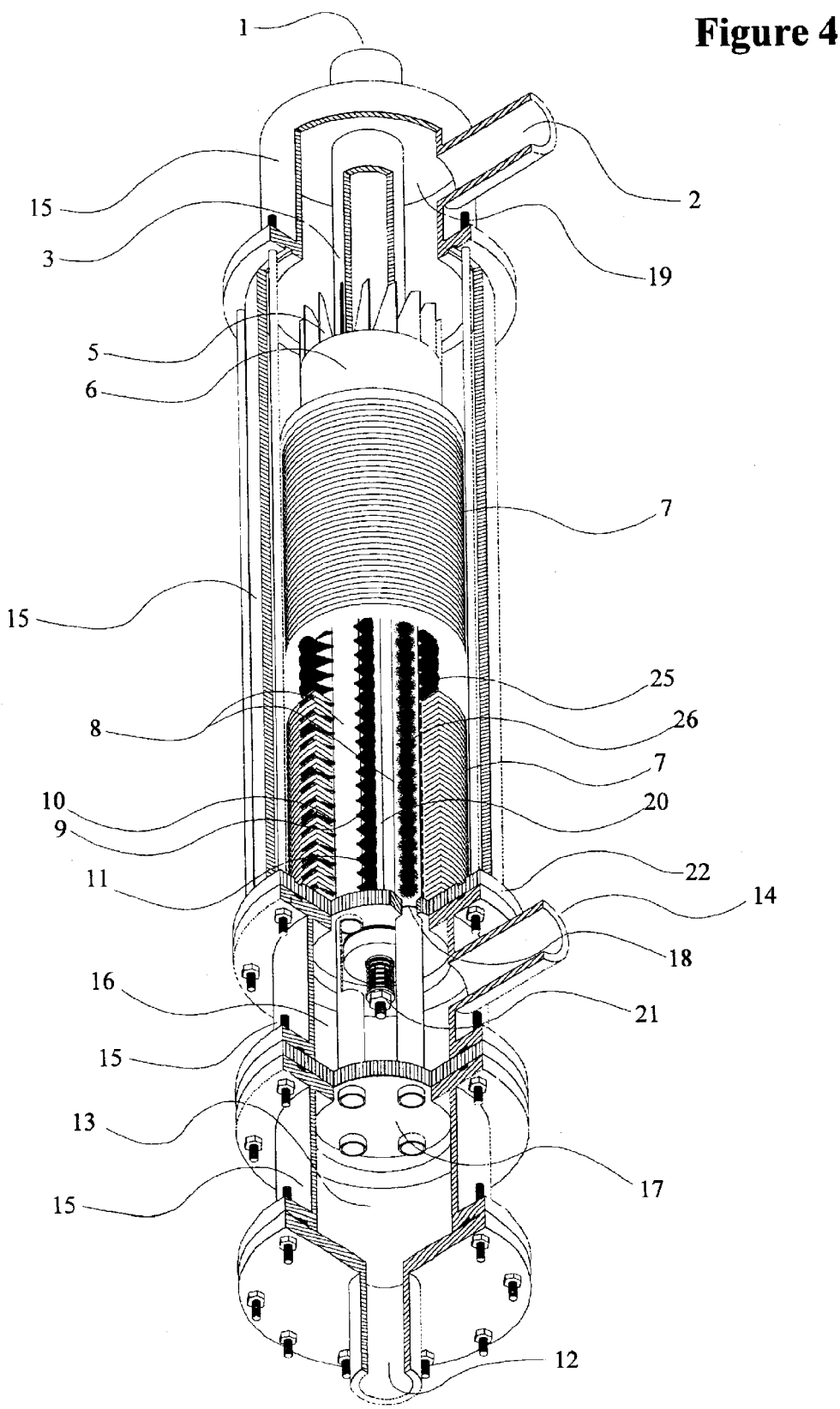
FIG. 4 is a bottom perspective view of the preferred embodiment operating in the back flushing mode wherein high pressure back flushing fluid is introduced into the back flush receiver inlet on the downstream end of the filter. This figure illustrates the employment of the pressurized moveable plunger assembly wherein the moveable plunger is driven to impede inlet flow, decompress the filtration disks and impede flow through the filtrate port located on the downstream interior side of the disk stack. Also illustrated in this figure is the centrifugal impact diffuser configuration incorporated to incite inlet rotation. The shown embodiment subsumes wash jet sets on tubular support members each set consisting of equal sized, coplanar, non-parallel though primarily opposing jets.

Description—FIGS. 3 and 4

Direct to obtaining the effect of the invention a preferred embodiment, operating in the back flushing mode, is illustrated in perspective on FIG. 3 as an inclined to the upstream view and FIG. 4 as an inclined to the downstream view. Operational definition of the preferred embodiment is as follows.

During the back flushing process, back flush medium is introduced under high pressure into the back flush receiver inlet 12 via an opening and closing control valve (not shown, in the cleaning media inlet conveyance. The pressurized back flush medium enters through the filter body 15 and into the back flush receiver plenum chamber 13. The back flush medium exits the back flush receiver plenum 13 and enters the open ends of the hollow tubular support members 8. The high pressure back flush fluid is conveyed by means of the tubular support members 8 through the tubular support base 17, through the filtrate plenum chamber 19 and through the disk support base 22 and seal 18. The back flush fluid initially passes the orifice sets 9 and 10 and into the moveable plunger assembly 6. The pressure exerted by back flush fluid drives the moveable plunger 6 in the upstream direction compelling the plunger valve seat 4 onto the valve seat receiver end of the inlet port 3, effectively shutting off the unfiltered water supply from 1. Concurrent with this action, the backside of the moveable plunger assembly 6 moves away from the filtration disk 7 stack, thereby releasing compression of the disks 7 of the stack in the axial direction. Further, the motion of the moveable plunger assembly 6 draws tension upon the connecting shaft 20 pulling the filtrate valve assembly 21 in a moveable relationship to receiver surface on the downstream side of the disk support base 17 thereby sealing the upstream side of the disk support base 17 from the filtrate plenum region 19. The back flush fluid pressurizes the internal tubular support members 8 generating a plurality of fluid jets 25 and 26 from the paired orifices 9 and 10 as coplanar, essentially equal velocity jets. These jets 25 and 26 impinge upon the released filter disks 7 and purvey a hydraulic scouring and cleaning action on the filter disk 7 surfaces. The back flush fluid jets 25 and 26 discharge across the filter disks 7 in nearly opposing directions. As a consequence, debris adhering to the disk 7 surfaces is impacted from different directions, thereby purveying an enhanced cleaning efficacy of the disks 7. Further, the slightly nonparallel opposite directions of the jets fluids 25 and 26 generate slightly unequal drag forces across the disk 7 surfaces. The back flush fluid jet 25 ejected from orifice 9 tends to drag the filter disks 7 in a right handed rotational direction. The back flush fluid jet 26 ejected from orifice 10 tends to drag the filter disks 7 in a left handed rotational direction. As a consequence of the slight variance from opposite of the impact angles of the of the two jets 25 and 26 upon the filter disk 7, a slight rotational motion is imparted to disk 7. This motion, in concert with the two nearly opposite impact angles of jets 25 and 26, assure an essentially full 180 degree scouring action across the disk 7 surfaces which purveys superior cleaning efficiency. The slight variance from opposite of the impact angles of the two jets 25 and 26 is important to assure a slow rotational speed of the impacted disks 7. High rotational speed results in a detrimental variance of the relative velocity of impact between the two jets 25 and 26 and the disk 7. The effect of this variance is a bias of the cleaning efficiency of the jet impacting the disk 7 surface in an oncoming fashion relative to that of the jet impacting the disk 7 surface in a retreating fashion. Such bias reduces the overall disk 7 cleaning effectiveness.

The spent and solids laden back flush waste fluid exits external to the back flush disk 7 stack and is conveyed in the annular space between the external surface of the disk 7 stack and the internal surface of the filter body 15 to the waste discharge plenum 19 and then to the outlet for the solids laden discharge 2 via an opening and closing control valve (not shown) in the spent back flush media and waste debris outlet conveyance.

Figure 5:
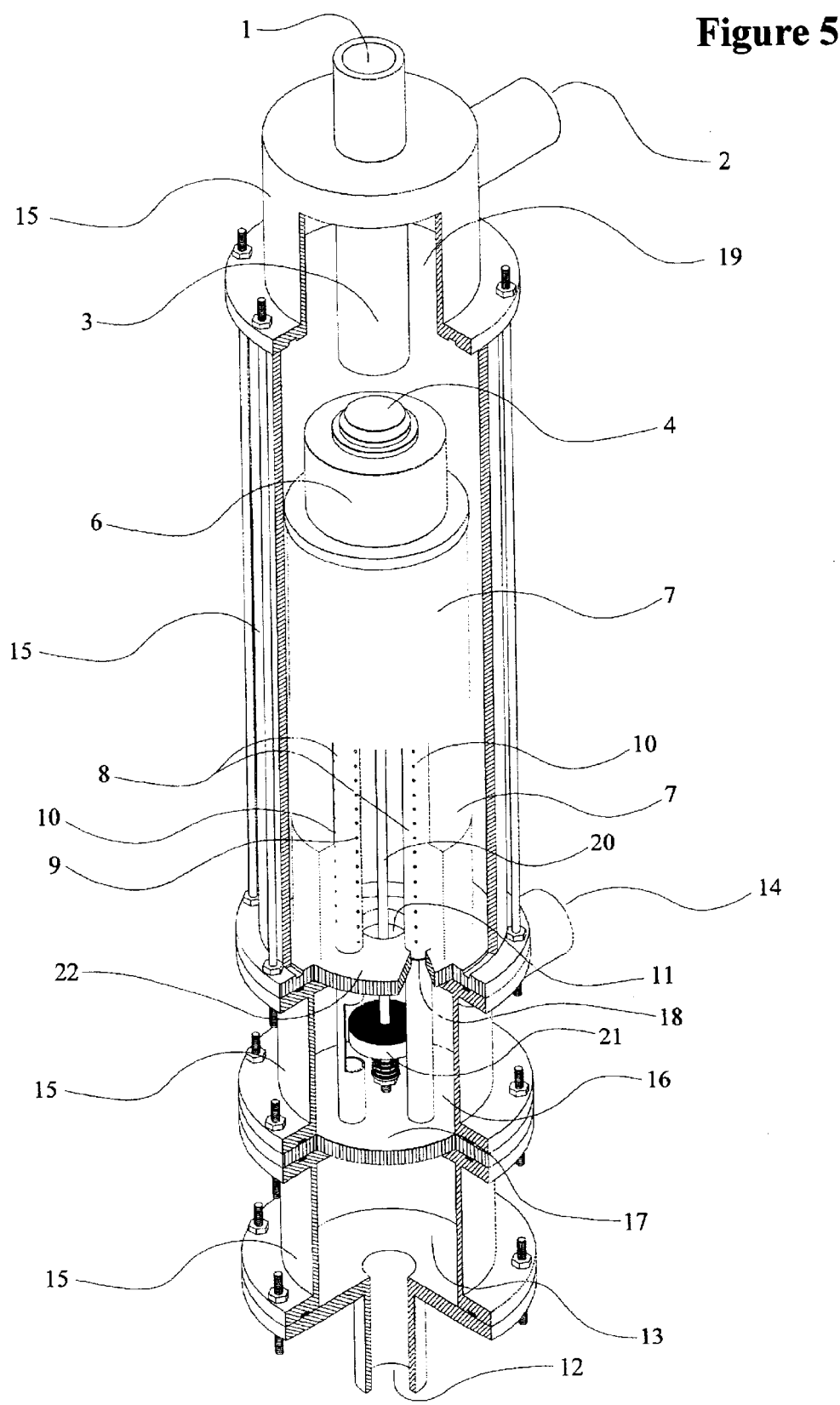
FIG. 5 is a top perspective view of an embodiment operating in the filtration mode. This figure illustrates the employment of the moveable plunger assembly wherein the moveable plunger is positioned to afford inlet flow, disk sealing and compression and filtrate porting from the downstream interior side of the disk stack. This embodiment is configured without the centrifugal impact diffuser as would be typical for pre-coat applications. The shown embodiment subsumes wash orifice sets on tubular support members each set consisting of equal sized, coplanar, non-parallel though primarily opposing orifice.
Figure 6:
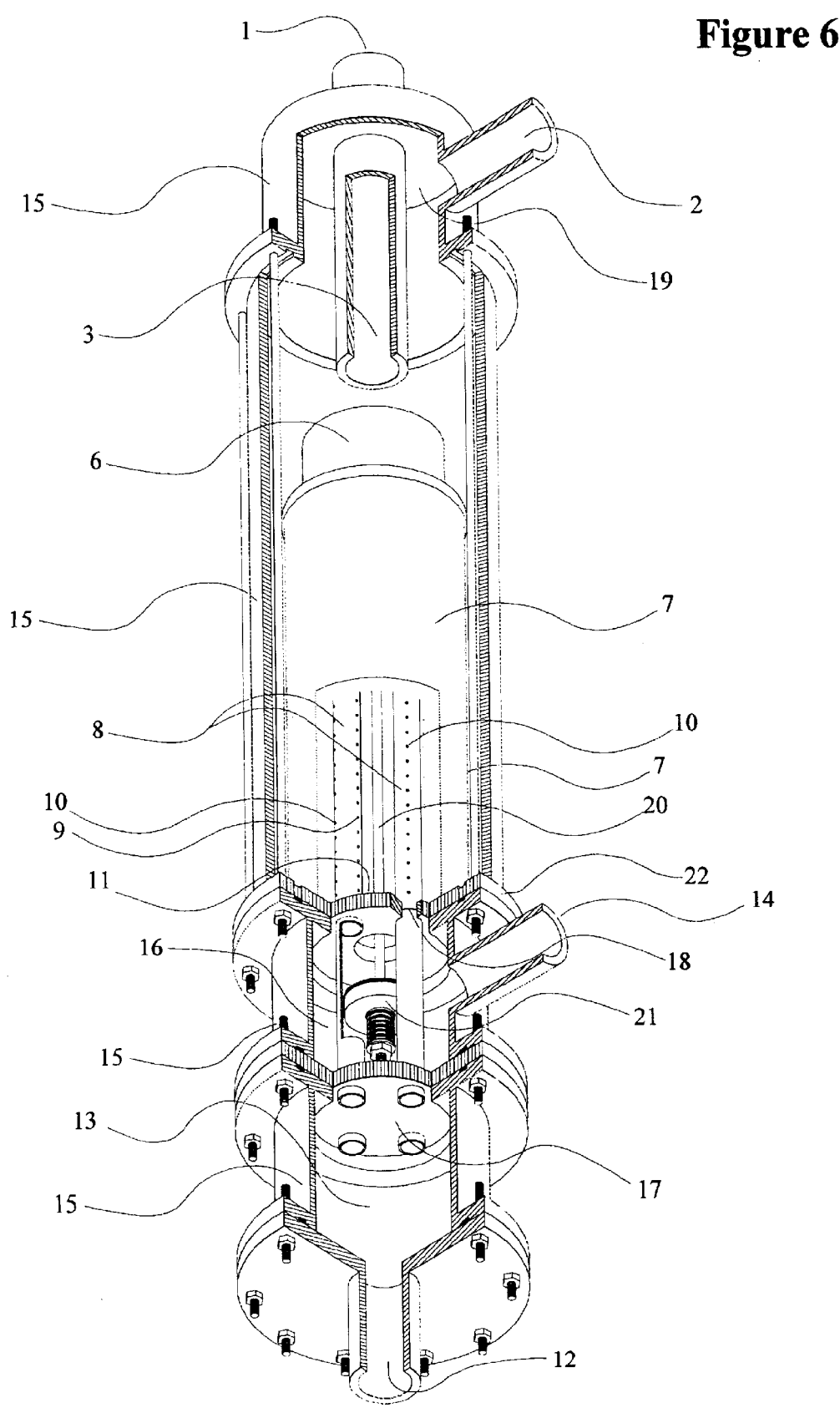
FIG. 6 is a bottom perspective view of an embodiment operating in the filtration mode. This figure illustrates the employment of the moveable plunger assembly wherein the moveable plunger is positioned to afford inlet flow, disk sealing and compression and filtrate porting from the downstream interior side of the disk stack. This embodiment is configured without the centrifugal impact diffuser as would be typical for pre-coat applications. The shown embodiment subsumes wash orifice sets on tubular support members each set consisting of equal sized, coplanar, non-parallel though primarily opposing orifice.

Description—FIGS. 5 and 6

Direct to obtaining the effect of the invention an embodiment for which an induced swirl is not desirable, such as those applications for which a pre-coat or filter aid is employed, is illustrated operating in the filtration mode in perspective on FIG. 5 as an inclined to the upstream view and FIG. 6 as an inclined to the downstream view. Operational definition of the embodiment is as follows.

Unfiltered fluid is introduced under pressure into the filter body 15 via the inlet 1 of the invention. The unfiltered fluid travels through the inlet port 3 and discharges from the valve seat receiver end of the inlet tube 3 onto the inlet valve seat area 4 located on top of the moveable plunger 6. The unfiltered fluid impacts against the inlet valve seat area 4 and is impelled by the impact radially outward.

The unfiltered fluid passes through the annular space between the filter body 15 and the external surface of the filtration disks 7 stack. The upstream end of the filtration disks 7 stack is sealed by the backside of the moveable plunger 6 being in the opened inlet, filtration mode position. The downstream end of the filtration disks 7 stack is sealed by the disk support base 22. The fluid passes between the filtration disks 7 of the stack and accedes to the internal volume of the filtration disks 7 stack as a filtrate. The filtrate exits the disks 7 via the filtrate discharge port 11 adjacent to the connecting rod 20, past the open discharge valve 21 and enters the filtrate plenum 19 for conveyance via the filtrate discharge outlet 14 to process.

Figure 7:
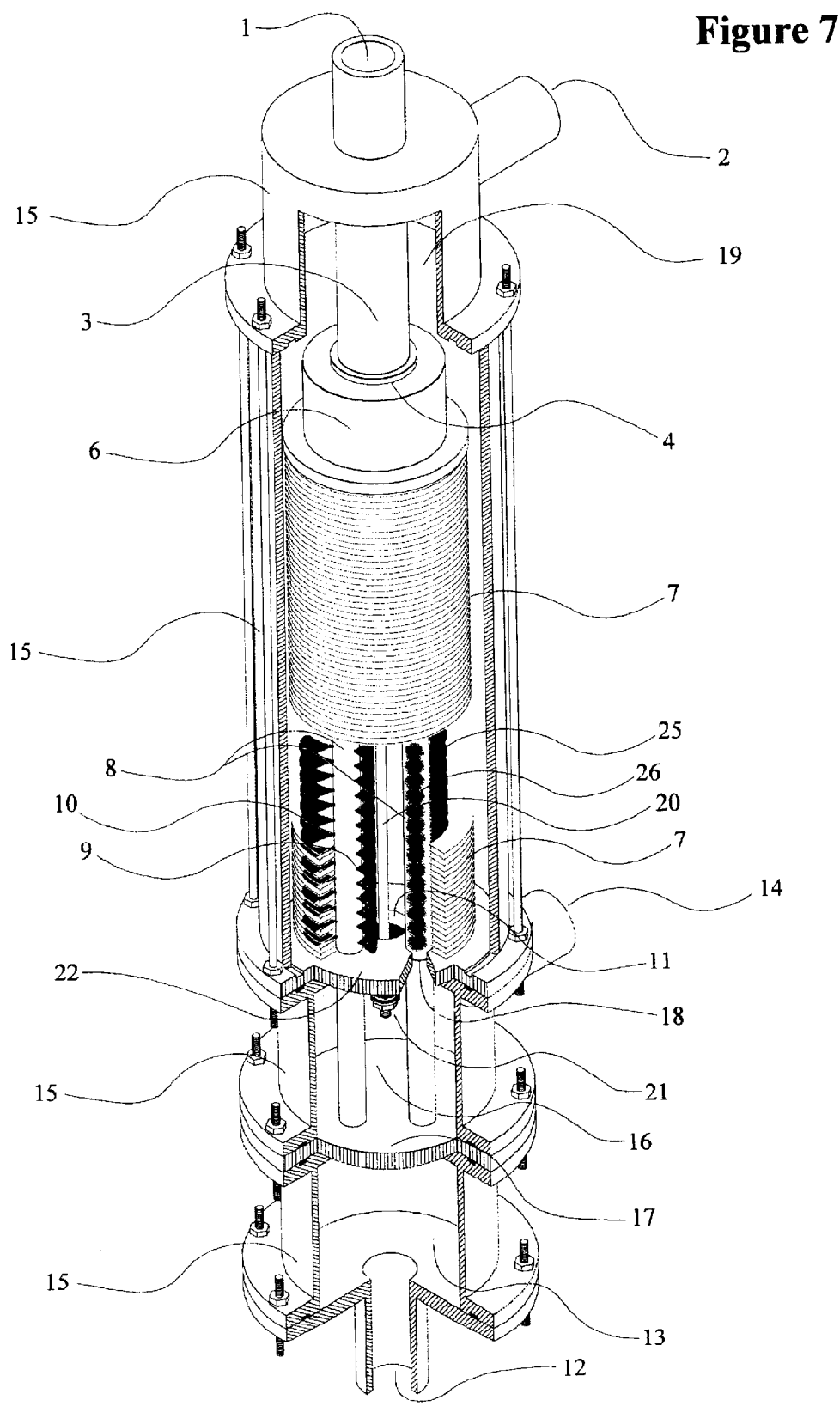
FIG. 7 is a top perspective view of an embodiment operating in the back flushing mode wherein high pressure back flushing fluid is introduced into the back flush receiver inlet on the downstream end of the filter. This figure illustrates the employment of the pressurized moveable plunger assembly wherein the moveable plunger is driven to impede inlet flow, decompress the filtration disks and impede flow through the filtrate port located on the downstream interior side of the disk stack. This embodiment is configured without the centrifugal impact diffuser as would be typical for pre-coat applications. The shown embodiment subsumes wash jet sets on tubular support members each set consisting of equal sized, coplanar, non-parallel though primarily opposing jets.
Figure 8:
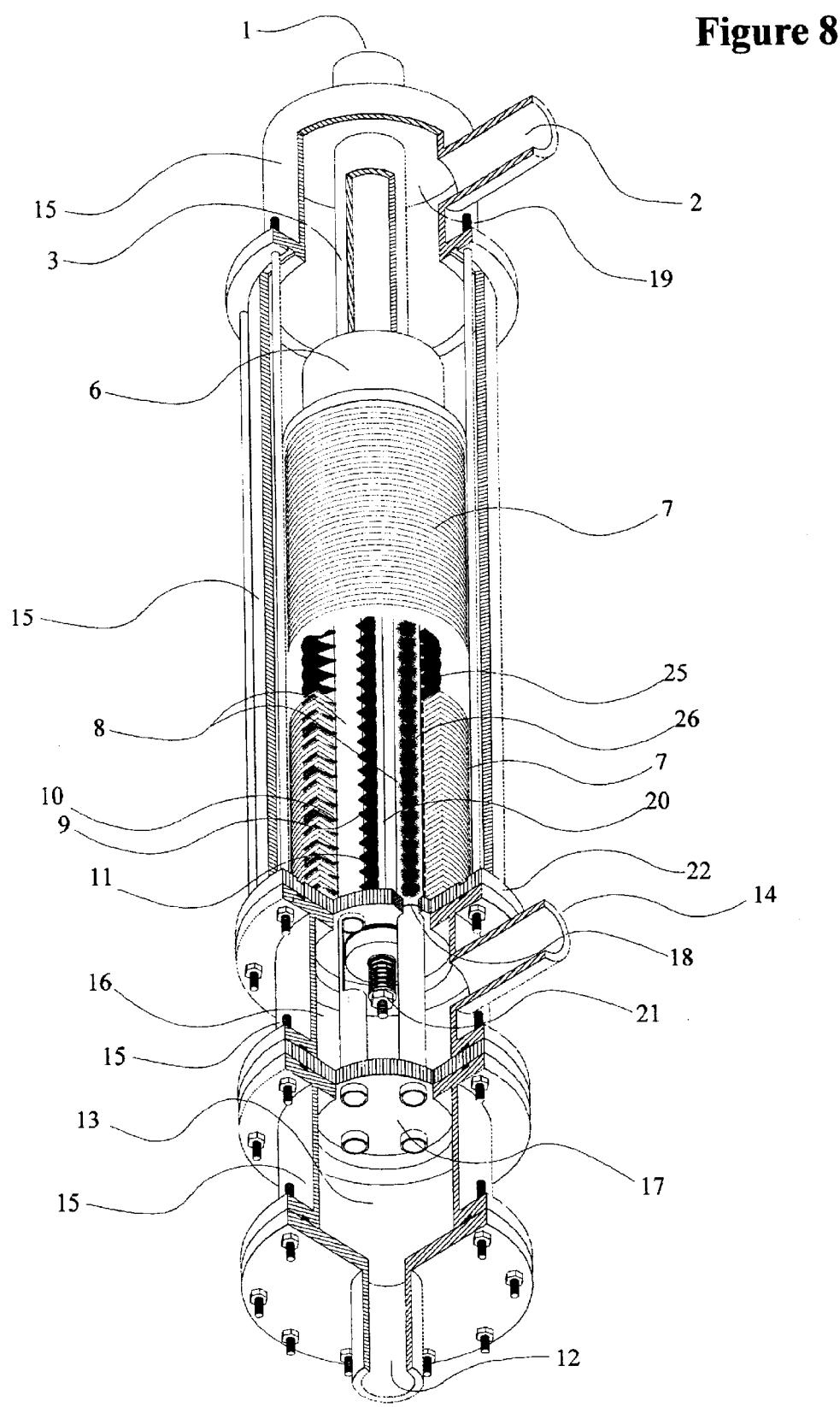
FIG. 8 is a bottom perspective view of an embodiment operating in the back flushing mode wherein high pressure back flushing fluid is introduced into the back flush receiver inlet on the downstream end of the filter. This figure illustrates the employment of the pressurized moveable plunger assembly wherein the moveable plunger is driven to impede inlet flow, decompress the filtration disks and impede flow through the filtrate port located on the downstream interior side of the disk stack. This embodiment is configured without the centrifugal impact diffuser as would be typical for pre-coat applications. The shown embodiment subsumes wash jet sets on tubular support members each set consisting of equal sized, coplanar, non-parallel though primarily opposing jets.

Description—FIGS. 7 and 8

Direct to obtaining the effect of the invention an embodiment for which an induced swirl is not desirable, such as those applications for which a pre-coat or filter aid is employed, is illustrated operating in the back flushing mode in perspective on FIG. 7 as an inclined to the upstream view and FIG. 8 as an inclined to the downstream view. Operational definition of the embodiment is as follows.

During the back flushing process, back flush medium is introduced under high pressure into the back flush receiver inlet. 12. The pressurized back flush medium enters through the filter body 15 and into the back flush receiver plenum chamber 13. The back flush medium exits the back flush receiver plenum 13 and enters the open ends of the hollow tubular support members 8. The high pressure back flush fluid is conveyed by means of the tubular support members 8 through the tubular support base 17, through the filtrate plenum chamber 19 and through the disk support base 22 and seal 18. The back flush fluid initially passes the orifice sets 9 and 10 and into the moveable plunger assembly 6. The pressure exerted by back flush fluid drives the moveable plunger 6 in the upstream direction compelling the plunger valve seat 4 onto the valve seat receiver end of the unfiltered inlet tube 3, effectively shutting off the unfiltered water supply from 1. Concurrent with this action, the backside of the moveable plunger assembly 6 moves away from the filtration disk 7 stack, thereby releasing compression of the disks 7 of the stack in the axial direction. Further, the motion of the moveable plunger assembly 6 draws tension upon the connecting rod 20 pulling the filtrate valve assembly 21 in a sealing relationship to receiver surface on the downstream side of the disk support base 17 thereby sealing the upstream side of the disk support base 17 from the filtrate plenum region 19. The back flush fluid pressurizes the internal tubular support members 8 generating a plurality of fluid jets 25 and 26 from the paired orifices 9 and 10 as coplanar, essentially equal velocity jets. These jets 25 and 26 impinge upon the released filter disks 7 and purvey a hydraulic scouring and cleaning action on the filter disk 7 surfaces. The back flush fluid jets 25 and 26 discharge across the filter disks 7 in nearly opposing directions. As a consequence, debris adhering to the disk 7 surfaces is impacted from different directions, thereby purveying an enhanced cleaning efficacy of the disks 7. Further, the slightly non-parallel opposite directions of the jets fluids 25 and 26 generate slightly unequal drag forces across the disk 7 surfaces. The back flush fluid jet 25 ejected from orifice 9 tends to drag the filter disks 7 in a right handed rotational direction. The back flush fluid jet 26 ejected from orifice 10 tends to drag the filter disks 7 in a left handed rotational direction. As a consequence of the slight variance from opposite of the impact angles of the of the two jets 25 and 26 upon the filter disk 7, a slight rotational motion is imparted to disk 7. This motion, in concert with the two nearly opposite impact angles of jets 25 and 10, assure an essentially full 180 degree scouring action across the disk 7 surfaces which purveys superior cleaning efficiency. The slight variance from opposite of the impact angles of the two jets 25 and 26 is important to assure a slow rotational speed of the impacted disks 7. High rotational speed results in a detrimental variance of the relative velocity of impact between the two jets 25 and 26 and the disk 7. The effect of this variance is a bias of the cleaning efficiency of the jet impacting the disk 7 surface in an oncoming fashion relative to that of the jet impacting the disk 7 surface in a retreating fashion. Such bias reduces the overall disk 7 cleaning effectiveness.

The spent and solids laden back flush waste fluid exits external to the back flush disk 7 stack and is conveyed in the annular space between the external surface of the disk 7 stack and the internal surface of the filter body 15 to the waste discharge plenum 19 and then to the outlet for the solids laden discharge 2.

Figure 9:
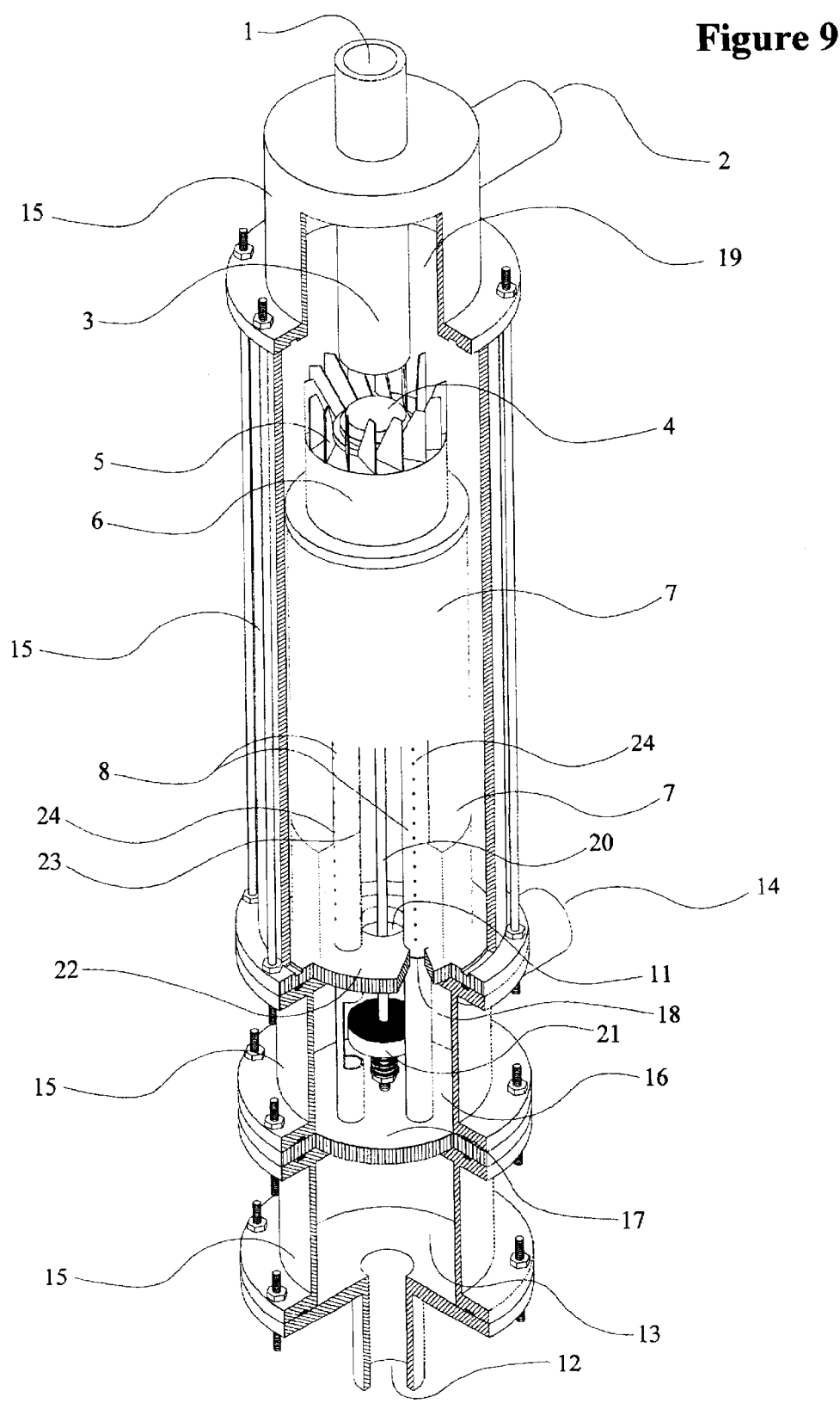
FIG. 9 is a top perspective view of an embodiment operating in the filtration mode. This figure illustrates the employment of the moveable plunger assembly wherein the moveable plunger is positioned to afford inlet flow, disk sealing and compression and filtrate porting from the downstream interior side of the disk stack. Also illustrated in this figure is the centrifugal impact diffuser configuration incorporated to incite inlet rotation. The shown embodiment subsumes wash orifice sets on tubular support members in the format of unequal flow capacity, coplanar, opposing orifice.
Figure 10:
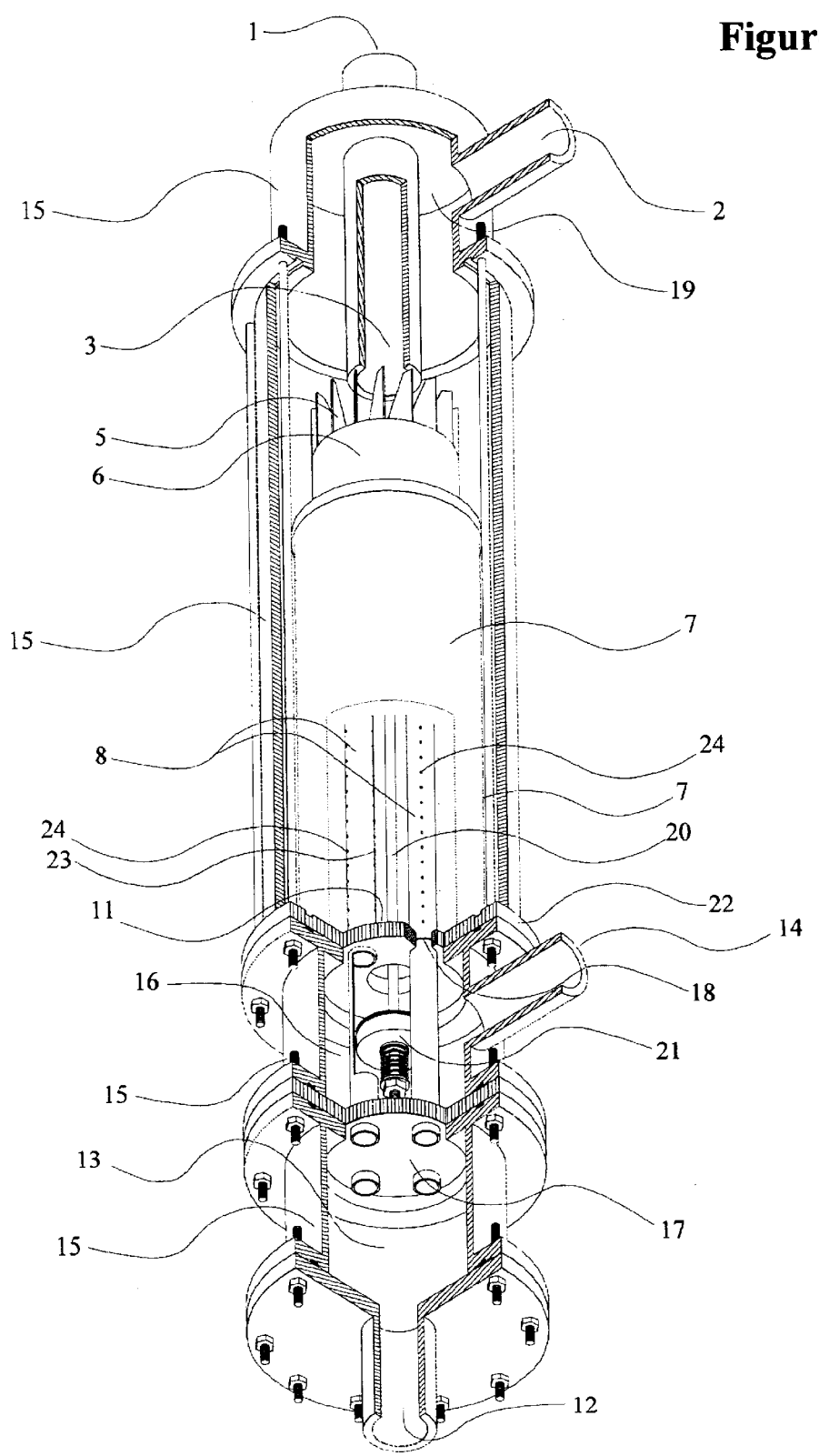
FIG. 10 is a bottom perspective view of an embodiment operating in the filtration mode. This figure illustrates the employment of the moveable plunger assembly wherein the moveable plunger is positioned to afford inlet flow, disk sealing and compression and filtrate porting from the downstream interior side of the disk stack. Also illustrated in this figure is the centrifugal impact diffuser configuration incorporated to incite inlet rotation. The shown embodiment subsumes wash orifice sets on tubular support members in the format of unequal flow capacity, coplanar, opposing orifice.

Description—FIGS. 9 and 10

Direct to obtaining the effect of the invention an embodiment employing differing sized jet nozzles so as to facilitate a controlled disk rotational speed during back flush is presented, operating in the filtration mode, in perspective on FIG. 9 as an inclined to the upstream view and FIG. 10 as an inclined to the downstream view. Operational definition of the embodiment is as follows.

Unfiltered fluid is introduced under pressure into the filter body 15 via the inlet 1 of the invention. The unfiltered fluid travels through the inlet port 3 and discharges from the valve seat receiver end of the inlet tube 3 onto the inlet valve seat area 4 located on top of the moveable plunger 6. The unfiltered fluid impacts against the inlet valve seat area 4 and is impelled by the impact radially outward acquiring a swirl while passing through the turning vanes of the centrifugal inlet impeller 5.

The swirling, unfiltered fluid passes through the annular space between the filter body 15 and the external surface of the filtration disks 7 stack. The upstream end of the filtration disks 7 stack is sealed by the backside of the moveable plunger 6 being in the opened inlet, filtration mode position. The downstream end of the filtration disks 7 stack is sealed by the disk support base 22. The fluid passes between the filtration disks 7 of the stack and accedes to the internal volume of the filtration disks 7 stack as a filtrate. The filtrate exits the disks 7 via the filtrate discharge port 11 adjacent to the connecting rod 20, past the open discharge valve 21 and enters the filtrate plenum 19 for conveyance via the filtrate discharge outlet 14 to process.

Figure 11:
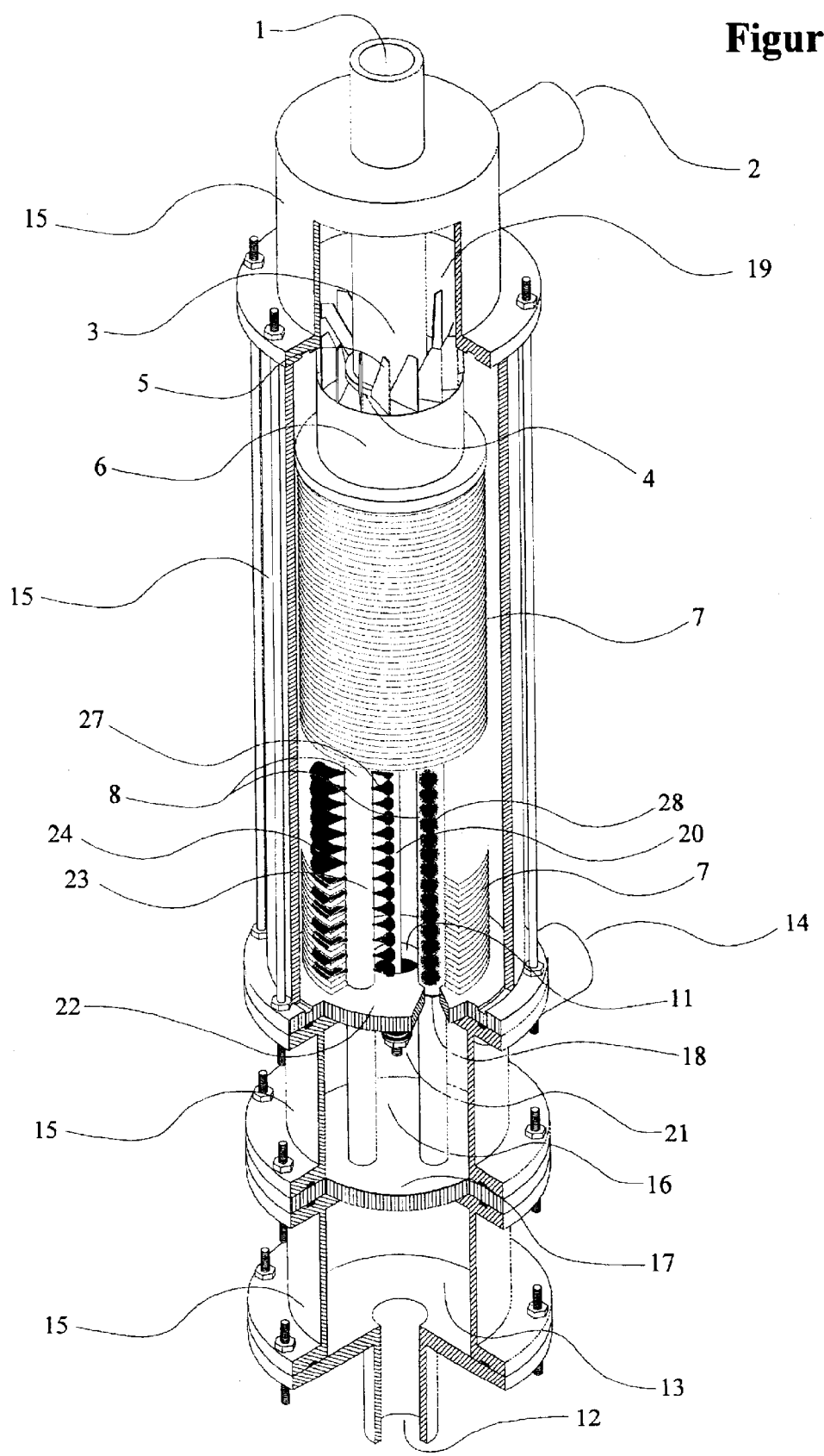
FIG. 11 is a top perspective view of an embodiment operating in the back flushing mode wherein high pressure back flushing fluid is introduced into the back flush receiver inlet on the downstream end of the filter. This figure illustrates the employment of the pressurized moveable plunger assembly wherein the moveable plunger is driven to impede inlet flow, decompress the filtration disks and impede flow through the filtrate port located on the downstream interior side of the disk stack. Also illustrated in this figure is the centrifugal impact diffuser configuration incorporated to incite inlet rotation. The shown embodiment subsumes wash jet sets on tubular support members in the format of unequal flow, coplanar, opposing jets.
Figure 12:
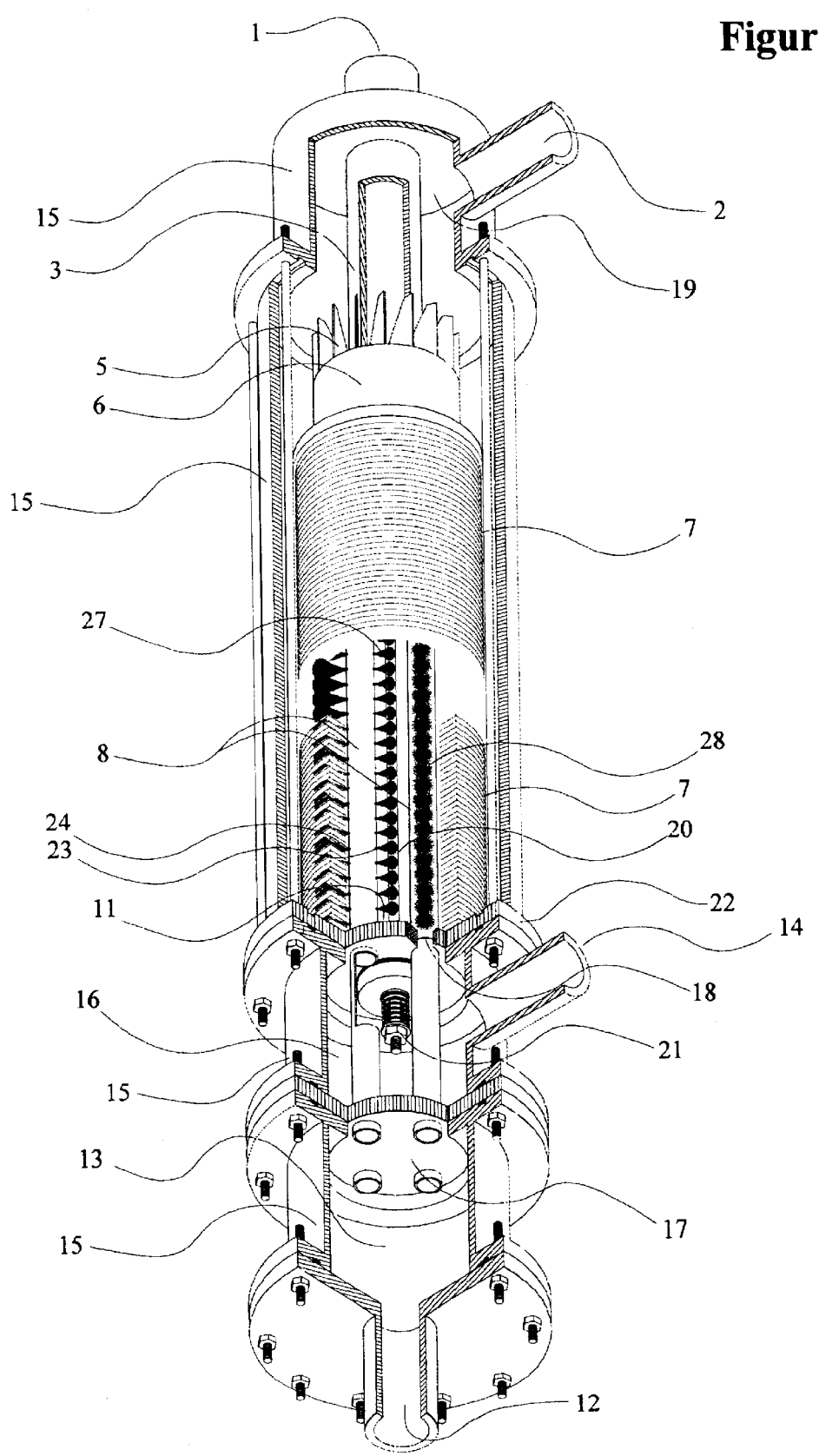
FIG. 12 is a bottom perspective view of an embodiment operating in the back flushing mode wherein high pressure back flushing fluid is introduced into the back flush receiver inlet on the downstream end of the filter. This figure illustrates the employment of the pressurized moveable plunger assembly wherein the moveable plunger is driven to impede inlet flow, decompress the filtration disks and impede flow through the filtrate port located on the downstream interior side of the disk stack. Also illustrated in this figure is the centrifugal impact diffuser configuration incorporated to incite inlet rotation. The shown embodiment subsumes wash jet sets on tubular support members in the format of unequal flow, coplanar, opposing jets.

Description—FIGS. 11 and 12

Direct to obtaining the effect of the invention an embodiment employing differing sized jet nozzle so as to facilitate a controlled disk rotational speed during back flush is presented, operating in the back flushing mode, in perspective on FIG. 11 as an inclined to the upstream view and FIG. 12 as an inclined to the downstream view. Operational definition of the embodiment is as follows.

During the back flushing process, back flush medium is introduced under high pressure into the back flush receiver inlet. 12. The pressurized back flush medium enters through the filter body 15 and into the back flush receiver plenum chamber 13. The back flush medium exits the back flush receiver plenum 13 and enters the open ends of the hollow tubular support members 8. The high pressure back flush fluid is conveyed by means of the tubular support members 8 through the tubular support base 17, through the filtrate plenum chamber 19 and through the disk support base 22 and seal 18. The back flush fluid initially passes the orifice sets 23 and 24 and into the moveable plunger assembly 6. The pressure exerted by back flush fluid drives the moveable plunger 6 in the upstream direction compelling the plunger valve seat 4 onto the valve seat receiver end of the unfiltered inlet tube 3, effectively shutting off the unfiltered water supply from 1. Concurrent with this action, the backside of the sealing plunger assembly 6 moves away from the filtration disk 7 stack, thereby releasing compression of the disks 7 of the stack in the axial direction. Further, the motion of the sealing plunger assembly 6 draws tension upon the connecting rod 20 pulling the filtrate valve assembly 21 in a sealing relationship to receiver surface on the downstream side of the disk support base 17 thereby sealing the upstream side of the disk support base 17 from the filtrate plenum region 19. The back flush fluid pressurizes the internal tubular support members 8 generating a plurality of fluid jets 23a and 24a from the paired orifices 23 and 24 as coplanar, slightly differing velocity jets. These jets 23a and 24a impinge upon the released filter disks 7 and purvey a hydraulic scouring and cleaning action on the filter disk 7 surfaces. The back flush fluid jets 23a and 24a discharge across the filter disks 7 in essentially opposing directions. As a consequence, debris adhering to the disk 7 surfaces is impacted from different directions, thereby purveying an enhanced cleaning efficacy of the disks 7. Further, the slightly different velocities of the jets fluids 23a and 24a generate slightly unequal drag forces across the disk 7 surfaces. The back flush fluid jet 23a ejected from orifice 23 tends to drag the filter disks 7 in a right handed rotational direction. The back flush fluid jet 24a ejected from orifice 24 tends to drag the filter disks 7 in a left handed rotational direction. As a consequence of the slight variance in impact velocity of the of the two jets 23a and 24a upon the filter disk 7, a slight rotational motion is imparted to disk 7. This motion, in concert with the essentially opposite impact angles of jets 23a and 24a, assure an essentially full 180 degree scouring action across the disk 7 surfaces which purveys superior cleaning efficiency. The slight difference of impact velocity of the two jets 23a and 24a is important to assure a slow rotational speed of the impacted disks 7. High rotational speed results in a detrimental variance of the relative velocity of impact between the two jets 23a and 24a and the disk 7. The effect of this variance is a bias of the cleaning efficiency of the jet impacting the disk 7 surface in an oncoming fashion relative to that of the jet impacting the disk 7 surface in a retreating fashion. Such bias reduces the overall disk 7 cleaning effectiveness.

The spent and solids laden back flush waste fluid exits external to the back flush disk 7 stack and is conveyed in the annular space between the external surface of the disk 7 stack and the internal surface of the filter body 15 to the waste discharge plenum 19 and then to the outlet for the solids laden discharge 2.

Figure 13:
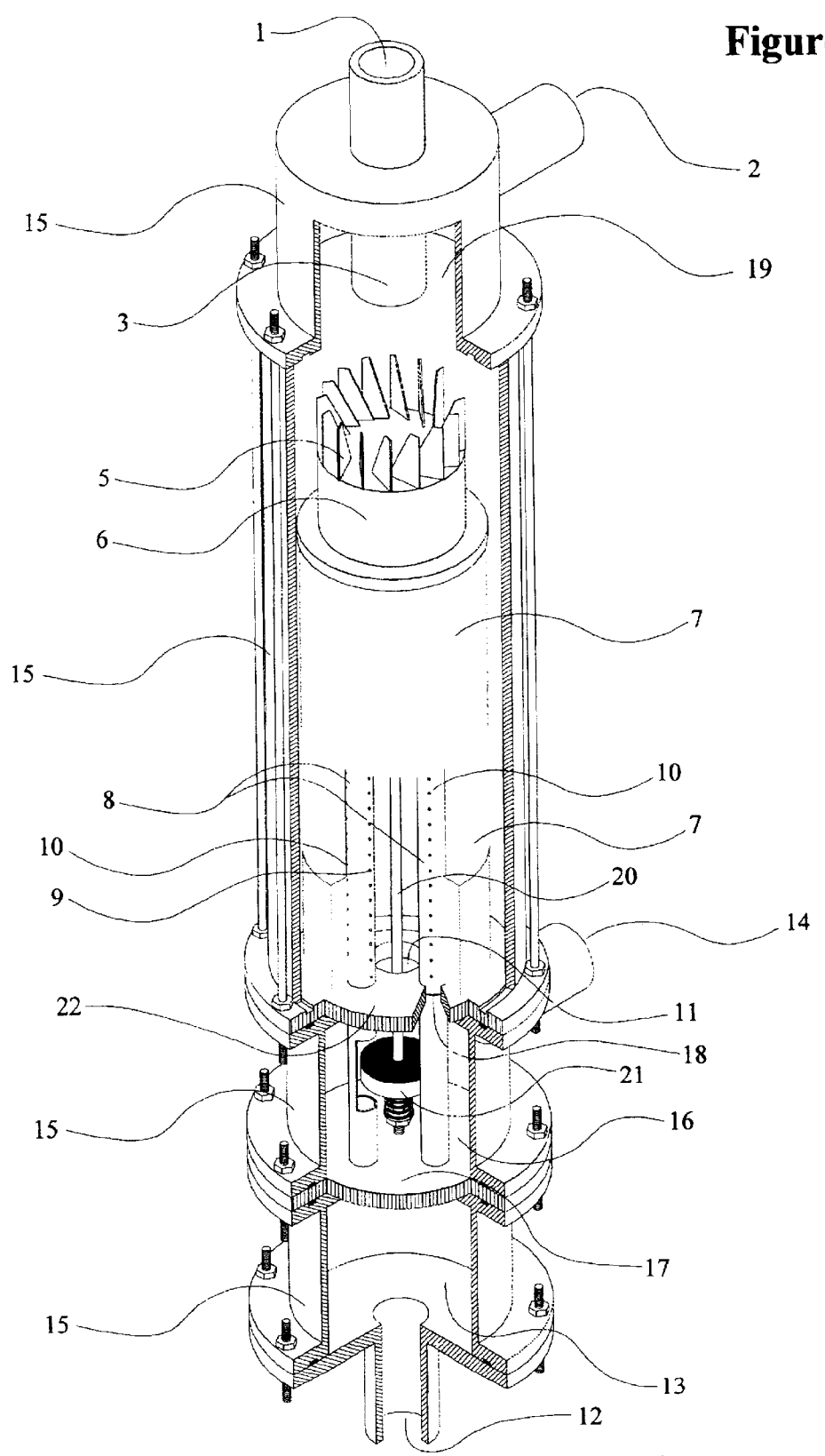
FIG. 13 is a top perspective view of an embodiment operating in the filtration mode. This figure illustrates the employment of the moveable plunger assembly wherein the moveable plunger is positioned to afford disk sealing and compression and filtrate porting from the downstream interior side of the disk stack. In this embodiment, it is assumed that inlet valving occurs external to the filter body. Also illustrated in this figure is the centrifugal impact diffuser configuration incorporated to incite inlet rotation. The shown embodiment subsumes wash orifice sets on tubular support members each set consisting of equal sized, coplanar, non-parallel though primarily opposing orifice.
Figure 14:
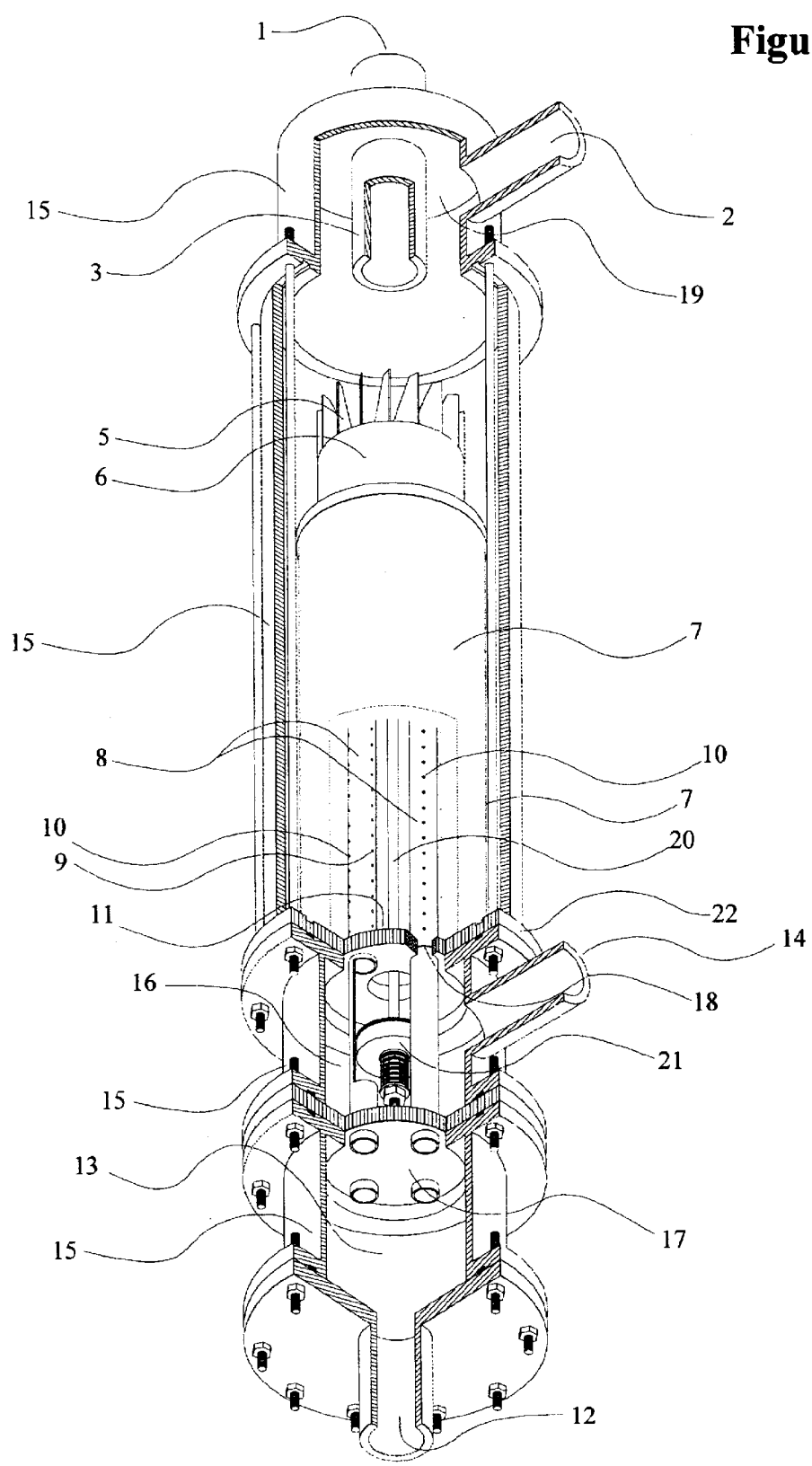
FIG. 14 is a bottom perspective view of an embodiment operating in the filtration mode. This figure illustrates the employment of the moveable plunger assembly wherein the moveable plunger is positioned to afford disk sealing and compression and filtrate porting from the downstream interior side of the disk stack. In this embodiment, it is assumed that inlet valving occurs external to the filter body. Also illustrated in this figure is the centrifugal impact diffuser configuration incorporated to incite inlet rotation. The shown embodiment subsumes wash orifice sets on tubular support members each set consisting of equal sized, coplanar, non-parallel though primarily opposing orifice.

Description—FIGS. 13 and 14

Direct to obtaining the effect of the invention an embodiment wherein an inlet valve external to the invention is employed, operating in the filtration mode, is illustrated in perspective on FIG. 13 as an inclined to the upstream view and FIG. 14 as an inclined to the downstream view. Operational definition of the embodiment is as follows.

Unfiltered fluid is introduced under pressure into the filter body 15 via the inlet 1 of the invention. The unfiltered fluid travels through the inlet port 3 and discharges from the end of the inlet tube 3 onto the top of the moveable plunger 6. The unfiltered fluid impacts against the top of the moveable plunger 6 and is impelled by the impact radially outward acquiring a swirl while passing through the turning vanes of the centrifugal inlet impeller 5.

The swirling, unfiltered fluid passes through the annular space between the filter body 15 and the external surface of the filtration disks 7 stack. The upstream end of the filtration disks 7 stack is sealed by the backside of the moveable plunger 6 being in the opened inlet, filtration mode position. The downstream end of the filtration disks 7 stack is sealed by the disk support base 22. The fluid passes between the filtration disks 7 of the stack and accedes to the internal volume of the filtration disks 7 stack as a filtrate. The filtrate exits the disks 7 via the filtrate discharge port 11 adjacent to the connecting rod 20, past the open discharge valve 21 and enters the filtrate plenum 19 for conveyance via the filtrate discharge outlet 14 to process.

Figure 15:
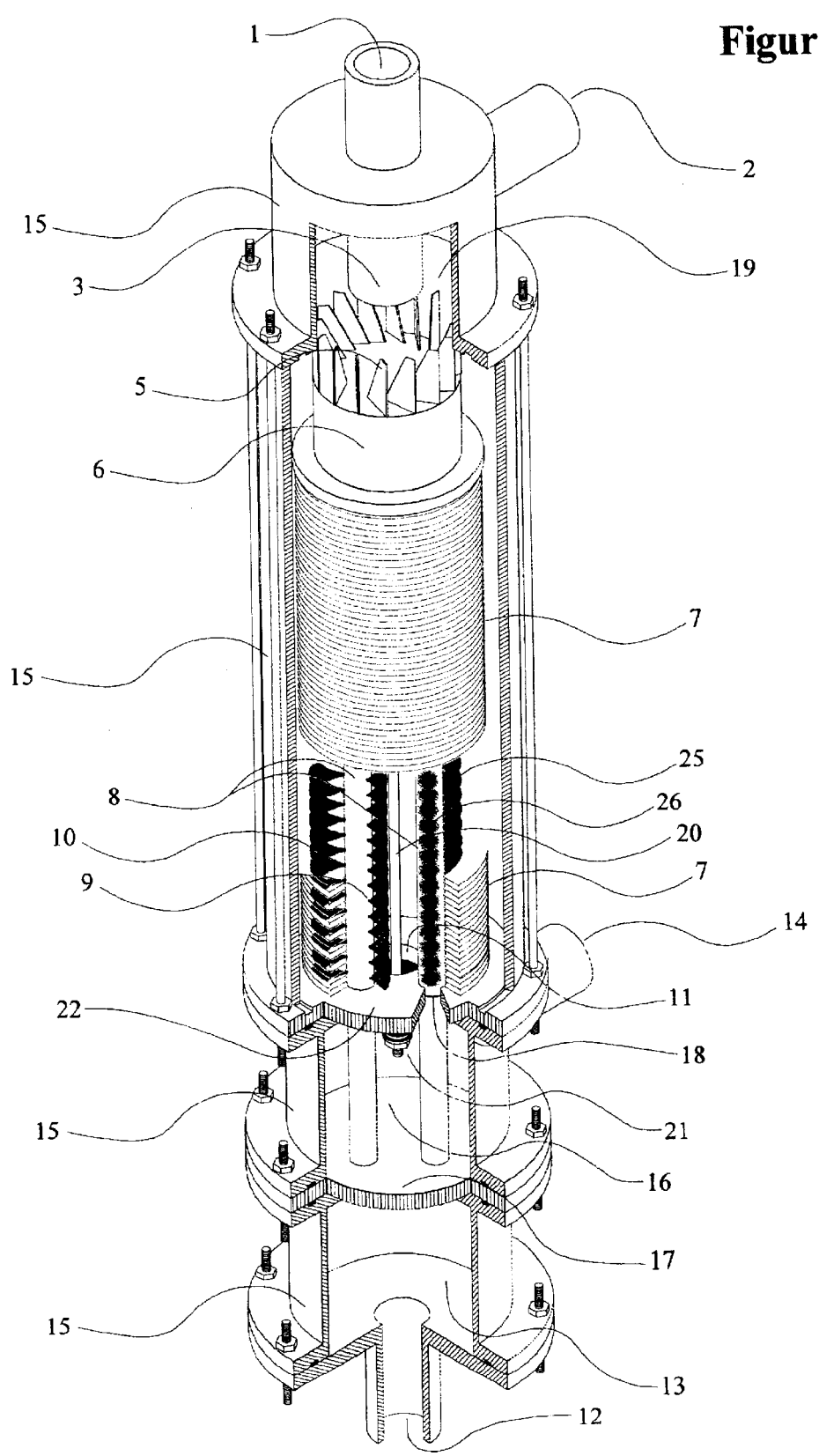
FIG. 15 is a top perspective view of an embodiment operating in the back flushing mode wherein high pressure back flushing fluid is introduced into the back flush receiver inlet on the downstream end of the filter. This figure illustrates the employment of the pressurized moveable plunger assembly wherein the moveable plunger is driven to decompress the filtration disks and impede flow through the filtrate port located on the downstream interior side of the disk stack. In this embodiment, it is assumed that inlet valving occurs external to the filter body. Also illustrated in this figure is the centrifugal impact diffuser configuration incorporated to incite inlet rotation. The shown embodiment subsumes wash jet sets on tubular support members each set consisting of equal sized, coplanar, non-parallel though primarily opposing jets.
Figure 16:
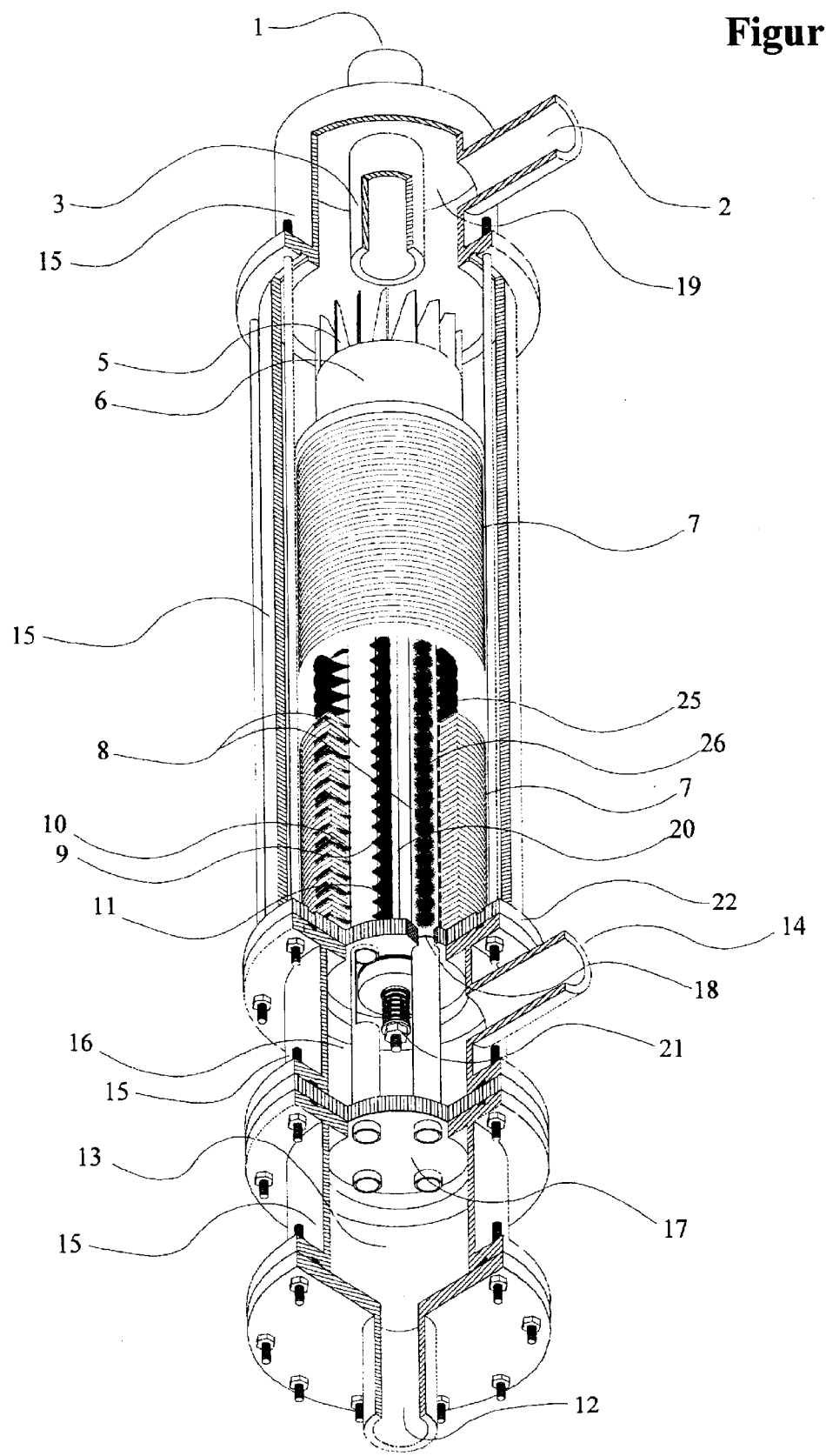
FIG. 16 is a bottom perspective view of an embodiment operating in the back flushing mode wherein high pressure back flushing fluid is introduced into the back flush receiver inlet on the downstream end of the filter. This figure illustrates the employment of the pressurized moveable plunger assembly wherein the moveable plunger is driven to decompress the filtration disks and impede flow through the filtrate port located on the downstream interior side of the disk stack. In this embodiment, it is assumed that inlet valving occurs external to the filter body. Also illustrated in this figure is the centrifugal impact diffuser configuration incorporated to incite inlet rotation. The shown embodiment subsumes wash jet sets on tubular support members each set consisting of equal sized, coplanar, non-parallel though primarily opposing jets.

Description—FIGS. 15 and 16

Direct to obtaining the effect of the invention an embodiment wherein an inlet valve external to the invention is employed, operating in the back flush mode, is illustrated in perspective on FIG. 15 as an inclined to the upstream view and FIG. 16 as an inclined to the downstream view. Operational definition of the embodiment is as follows.

During the back flushing process, back flush medium is introduced under high pressure into the back flush receiver inlet. 12. The pressurized back flush medium enters through the filter body 15 and into the back flush receiver plenum chamber 13. The back flush medium exits the back flush receiver plenum 13 and enters the open ends of the hollow tubular support members 8. The high pressure back flush fluid is conveyed by means of the tubular support members 8 through the tubular support base 17, through the filtrate plenum chamber 19 and through the disk support base 22 and seal 18. The back flush fluid initially passes the orifice sets 9 and 10 and into the sealing plunger 6. The pressure exerted by back flush fluid drives the sealing plunger 6 in the upstream direction compelling the sealing plunger 6 to move away from the filtration disk 7 stack, thereby releasing compression of the disks 7 of the stack in the axial direction. Further, the motion of the sealing plunger 6 draws tension upon the connecting rod 20 pulling the filtrate valve assembly 21 in a sealing relationship to receiver surface on the downstream side of the disk support base 17 thereby sealing the upstream side of the disk support base 17 from the filtrate plenum region 19. The back flush fluid pressurizes the internal tubular support members 8 generating a plurality of fluid jets 9a and 10a from the paired orifices 9 and 10 as coplanar, essentially equal velocity jets. These jets 9a and 10a impinge upon the released filter disks 7 and purvey a hydraulic scouring and cleaning action on the filter disk 7 surfaces. The back flush fluid jets 9a and 10a discharge across the filter disks 7 in nearly opposing directions. As a consequence, debris adhering to the disk 7 surfaces is impacted from different directions, thereby purveying an enhanced cleaning efficacy of the disks 7. Further, the slightly nonparallel opposite directions of the jets fluids 9a and 10a generate slightly unequal drag forces across the disk 7 surfaces. The back flush fluid jet 9a ejected from orifice 9 tends to drag the filter disks 7 in a right handed rotational direction. The back flush fluid jet 10a ejected from orifice 10 tends to drag the filter disks 7 in a left handed rotational direction. As a consequence of the slight variance from opposite of the impact angles of the of the two jets 9a and 10a upon the filter disk 7, a slight rotational motion is imparted to disk 7. This motion, in concert with the two nearly opposite impact angles of jets 9a and 10a, assure an essentially full 180 degree scouring action across the disk 7 surfaces which purveys superior cleaning efficiency. The slight variance from opposite of the impact angles of the two jets 9a and 10a is important to assure a slow rotational speed of the impacted disks 7. High rotational speed results in a detrimental variance of the relative velocity of impact between the two jets 9a and 10a and the disk 7. The effect of this variance is a bias of the cleaning efficiency of the jet impacting the disk 7 surface in an oncoming fashion relative to that of the jet impacting the disk 7 surface in a retreating fashion. Such bias reduces the overall disk 7 cleaning effectiveness.

The spent and solids laden back flush waste fluid exits external to the back flush disk 7 stack and is conveyed in the annular space between the external surface of the disk 7 stack and the internal surface of the filter body 15 to the waste discharge plenum 19 and then to the outlet for the solids laden discharge 2.

Figure 17:
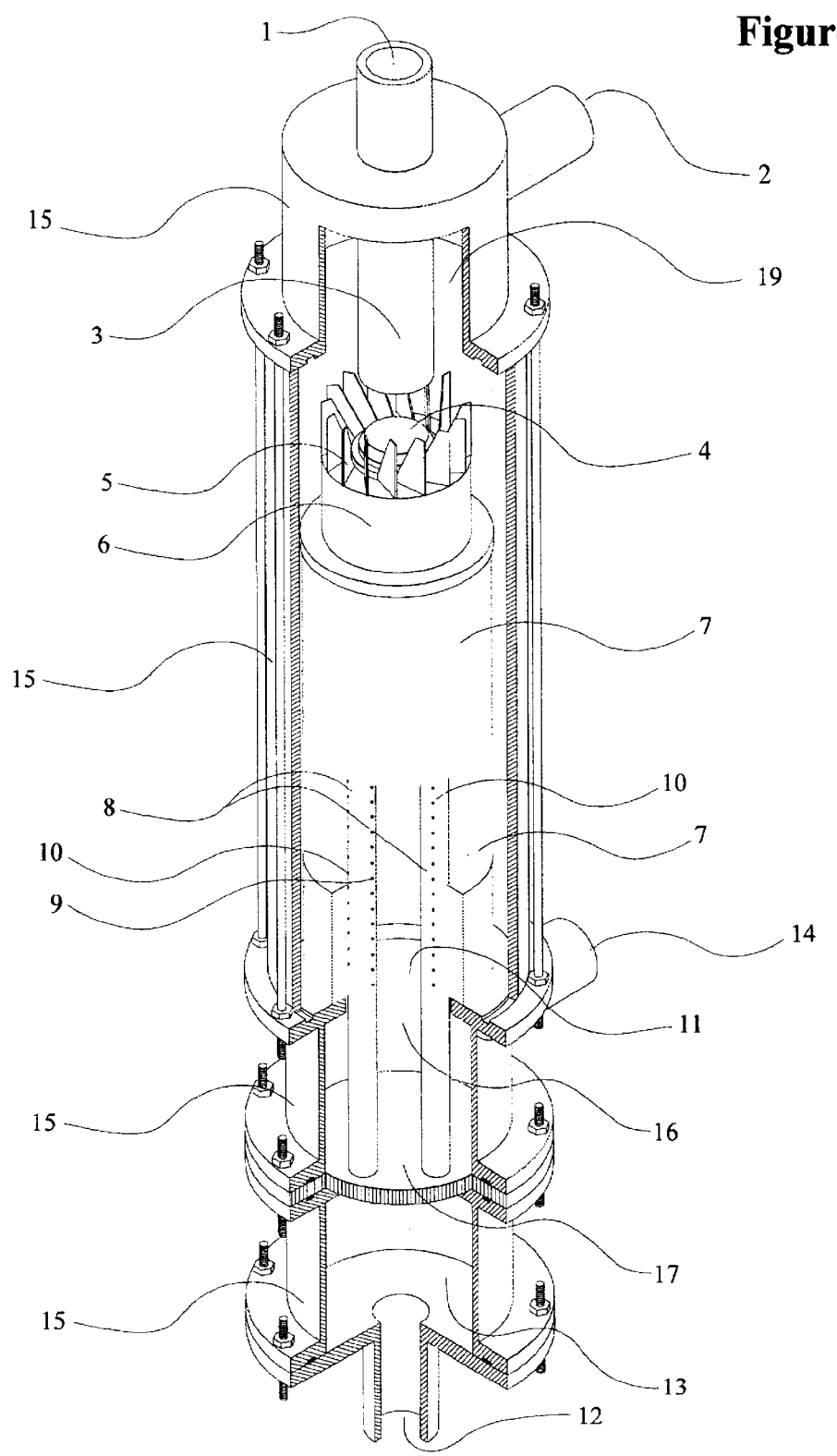
FIG. 17 is a top perspective view of an embodiment operating in the filtration mode. This figure illustrates the employment of the moveable plunger assembly wherein the moveable plunger is positioned to afford inlet flow, disk sealing and compression. In this embodiment, it is assumed that filtrate outlet valving occurs external to the filter body. Also illustrated in this figure is the centrifugal impact diffuser configuration incorporated to incite inlet rotation. The shown embodiment subsumes wash orifice sets on tubular support members each set consisting of equal sized, coplanar, non-parallel though primarily opposing orifice.
Figure 18:
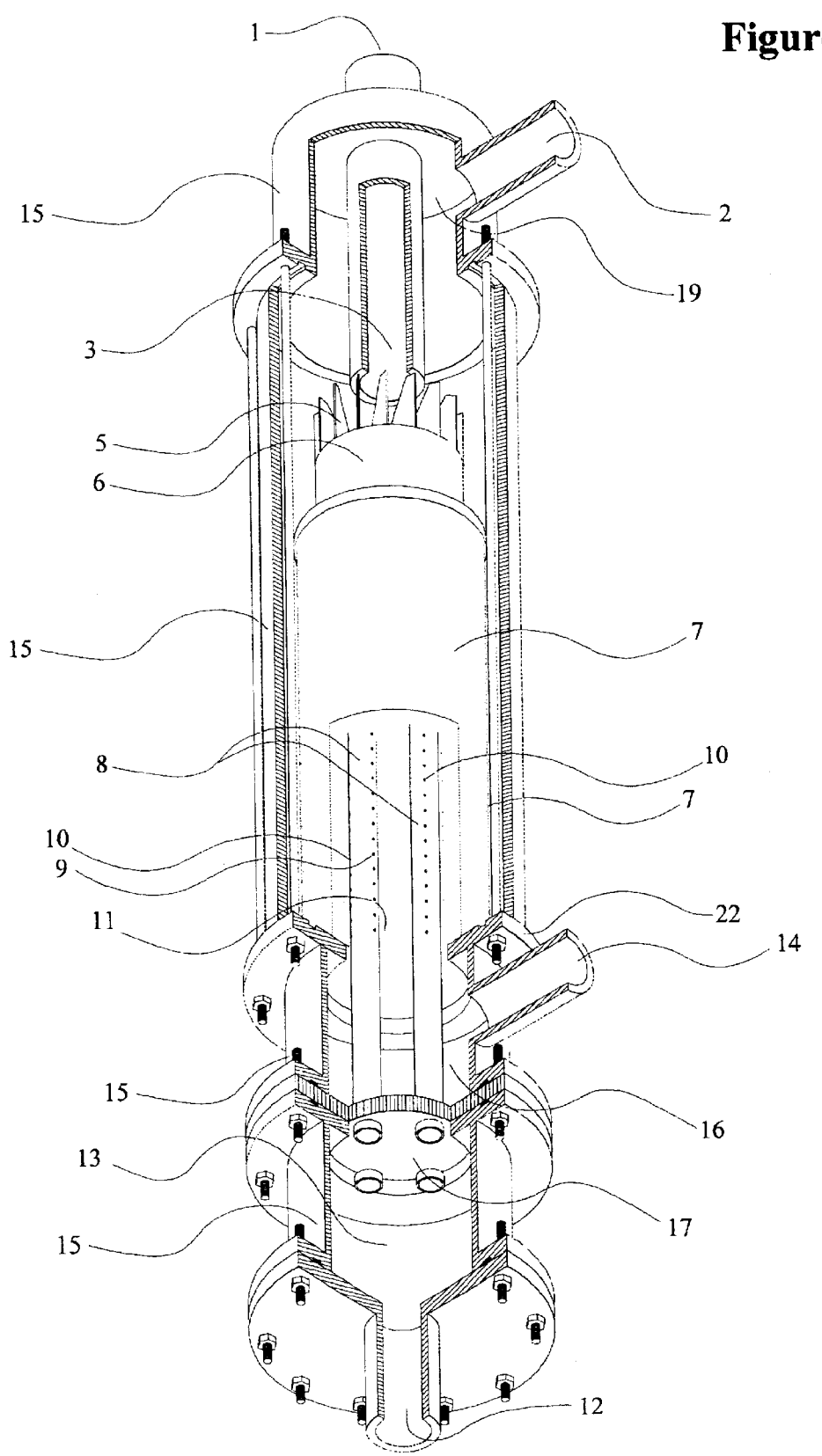
FIG. 18 is a bottom perspective view of an embodiment operating in the filtration mode. This figure illustrates the employment of the moveable plunger assembly wherein the moveable plunger is positioned to afford inlet flow, disk sealing and compression. In this embodiment, it is assumed that filtrate outlet valving occurs external to the filter body. Also illustrated in this figure is the centrifugal impact diffuser configuration incorporated to incite inlet rotation. The shown embodiment subsumes wash orifice sets on tubular support members each set consisting of equal sized, coplanar, non-parallel though primarily opposing orifice.

Description—FIGS. 17 and 18

Direct to obtaining the effect of the invention an embodiment wherein a filtrate outlet valve external to the invention is employed, operating in the filtration mode, is illustrated in perspective on FIG. 17 as an inclined to the upstream view and FIG. 18 as an inclined to the downstream view. Operational definition of the embodiment is as follows.

Unfiltered fluid is introduced under pressure into the filter body 15 via the inlet 1 of the invention. The unfiltered fluid travels through the inlet port 3 and discharges from the valve seat receiver end of the inlet tube 3 onto the inlet valve seat area 4 located on top of the moveable plunger 6. The unfiltered fluid impacts against the inlet valve seat area 4 and is impelled by the impact radially outward acquiring a swirl while passing through the turning vanes of the centrifugal inlet impeller 5.

The swirling, unfiltered fluid passes through the annular space between the filter body 15 and the external surface of the filtration disks 7 stack. The upstream end of the filtration disks 7 stack is sealed by the backside of the moveable plunger 6 being in the opened inlet, filtration mode position. The downstream end of the filtration disks 7 stack is sealed by the disk support base 22. The fluid passes between the filtration disks 7 of the stack and accedes to the internal volume of the filtration disks 7 stack as a filtrate. The filtrate exits the disks 7 via the filtrate discharge port and enters the filtrate plenum 19 for conveyance via the filtrate discharge outlet 14 to process.

Figure 19:
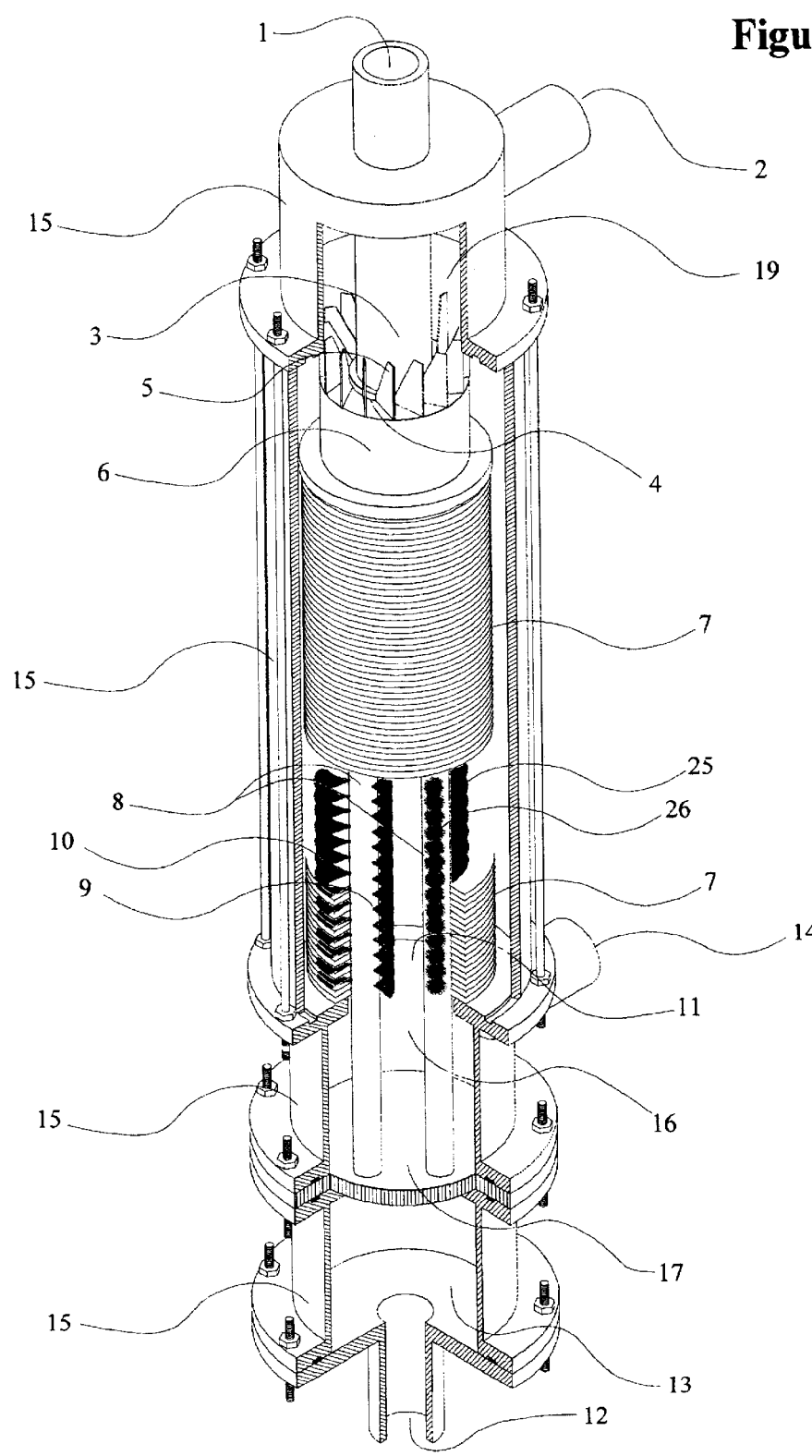
FIG. 19 is a top perspective view of an embodiment operating in the back flushing mode wherein high pressure back flushing fluid is introduced into the back flush receiver inlet on the downstream end of the filter. This figure illustrates the employment of the pressurized moveable plunger assembly wherein the moveable plunger is driven to impede inlet flow and decompress the filtration disks. In this embodiment, it is assumed that filtrate outlet valving occurs external to the filter body. Also illustrated in this figure is the centrifugal impact diffuser configuration incorporated to incite inlet rotation. The shown embodiment subsumes wash jet sets on tubular support members each set consisting of equal sized, coplanar, non-parallel though primarily opposing jets.
Figure 20:
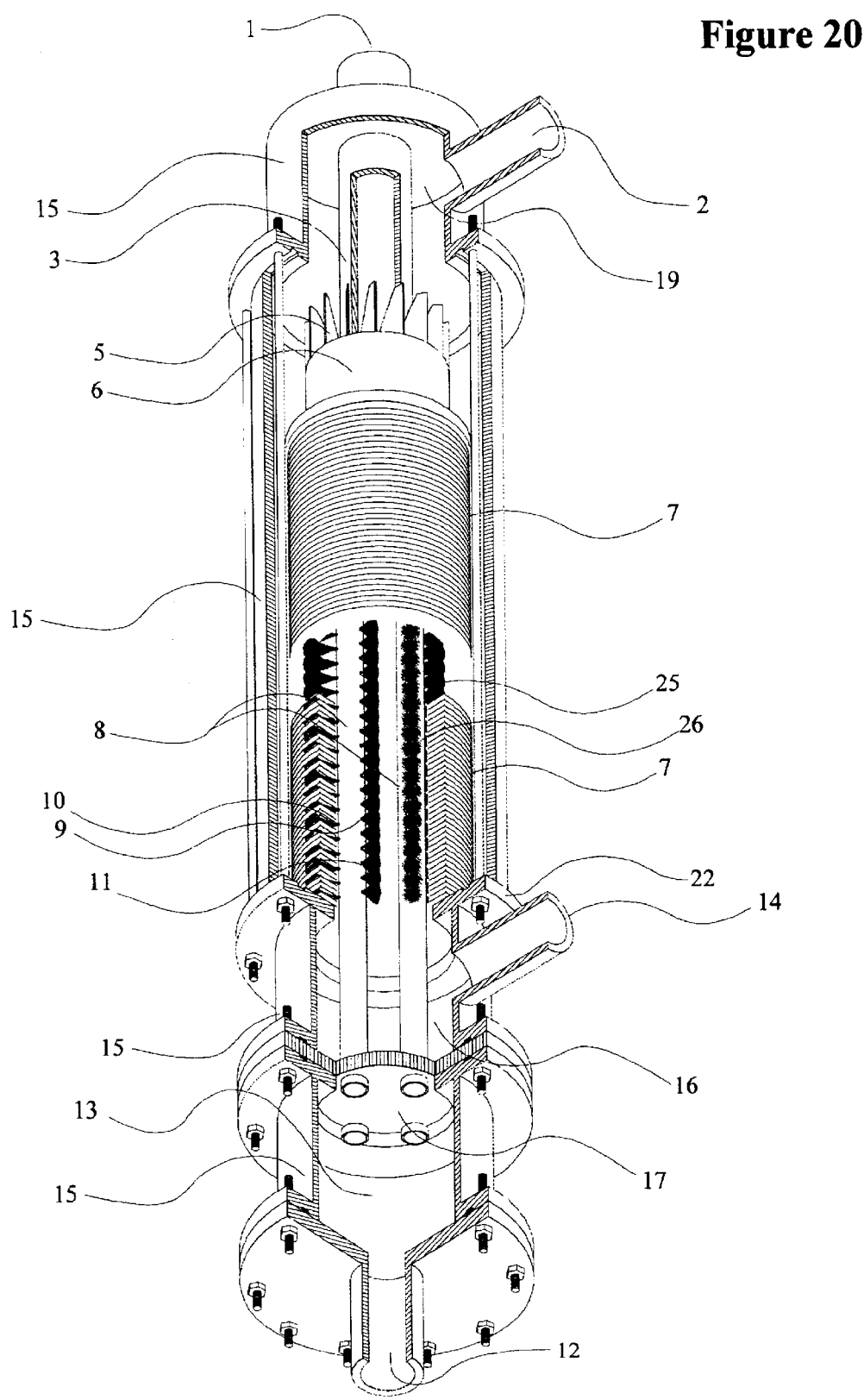
FIG. 20 is a bottom perspective view of an embodiment operating in the back flushing mode wherein high pressure back flushing fluid is introduced into the back flush receiver inlet on the downstream end of the filter. This figure illustrates the employment of the pressurized moveable plunger assembly wherein the moveable plunger is driven to impede inlet flow and decompress the filtration disks. In this embodiment, it is assumed that filtrate outlet valving occurs external to the filter body. Also illustrated in this figure is the centrifugal impact diffuser configuration incorporated to incite inlet rotation. The shown embodiment subsumes wash jet sets on tubular support members each set consisting of equal sized, coplanar, non-parallel though primarily opposing jets.

Description—FIGS. 19 and 20

Direct to obtaining the effect of the invention an embodiment wherein a filtrate outlet valve external to the invention is employed, operating in the back flush mode, is illustrated in perspective on FIG. 19 as an inclined to the upstream view and FIG. 20 as an inclined to the downstream view. Operational definition of the embodiment is as follows.

During the back flushing process, back flush medium is introduced under high pressure into the back flush receiver inlet. 12. The pressurized back flush medium enters through the filter body 16 and into the back flush receiver plenum chamber 13. The back flush medium exits the back flush receiver plenum 13 and enters the open ends of the hollow tubular support members 8. The high pressure back flush fluid is conveyed by means of the tubular support members 8 through the tubular support base 17, through the filtrate plenum chamber 19 and through the disk support base 22 and seal 18. The back flush fluid initially passes the orifice sets 9 and 10 and into the sealing plunger assembly 6. The pressure exerted by back flush fluid drives the sealing plunger 6 in the upstream direction compelling the plunger valve seat 4 onto the valve seat receiver end of the unfiltered inlet tube 3, effectively shutting off the unfiltered water supply from 1. Concurrent with this action, the backside of the sealing plunger assembly 6 moves away from the filtration disk 7 stack, thereby releasing compression of the disks 7 of the stack in the axial direction. The back flush fluid pressurizes the internal tubular support members 8 generating a plurality of fluid jets 9a and 10a from the paired orifices 9 and 10 as coplanar, essentially equal velocity jets. These jets 9a and 10a impinge upon the released filter disks 7 and purvey a hydraulic scouring and cleaning action on the filter disk 7 surfaces. The back flush fluid jets 9a and 10a discharge across the filter disks 7 in nearly opposing directions. As a consequence, debris adhering to the disk 7 surfaces is impacted from different directions, thereby purveying an enhanced cleaning efficacy of the disks 7. Further, the slightly nonparallel opposite directions of the jets fluids 9a and 10a generate slightly unequal drag forces across the disk 7 surfaces. The back flush fluid jet 9a ejected from orifice 9 tends to drag the filter disks 7 in a right handed rotational direction. The back flush fluid jet 10a ejected from orifice 10 tends to drag the filter disks 7 in a left handed rotational direction. As a consequence of the slight variance from opposite of the impact angles of the of the two jets 9a and 10a upon the filter disk 7, a slight rotational motion is imparted to disk 7. This motion, in concert with the two nearly opposite impact angles of jets 9a and 10a, assure an essentially full 180 degree scouring action across the disk 7 surfaces which purveys superior cleaning efficiency. The slight variance from opposite of the impact angles of the two jets 9a and 10a is important to assure a slow rotational speed of the impacted disks 7. High rotational speed results in a detrimental variance of the relative velocity of impact between the two jets 9a and 10a and the disk 7. The effect of this variance is a bias of the cleaning efficiency of the jet impacting the disk 7 surface in an oncoming fashion relative to that of the jet impacting the disk 7 surface in a retreating fashion. Such bias reduces the overall disk 7 cleaning effectiveness.

The spent and solids laden back flush waste fluid exits external to the back flush disk 7 stack and is conveyed in the annular space between the external surface of the disk 7 stack and the internal surface of the filter body 15 to the waste discharge plenum 19 and then to the outlet for the solids laden discharge 2.

Figure 21:
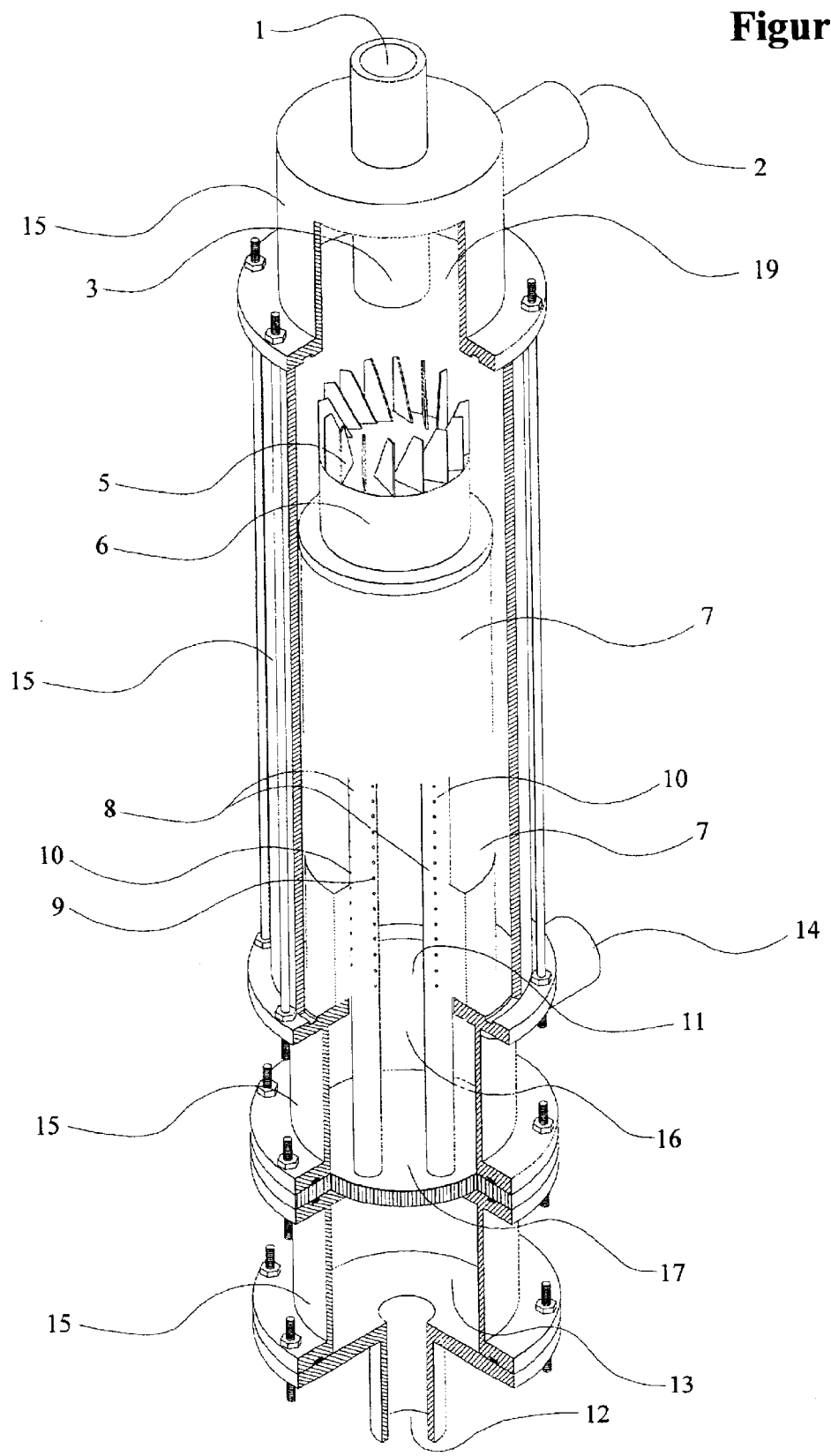
FIG. 21 is a top perspective view of an embodiment operating in the filtration mode. This figure illustrates the employment of the moveable plunger assembly wherein the moveable plunger is positioned to afford disk sealing and compression. In this embodiment, it is assumed that inlet and filtrate outlet valving occurs external to the filter body. Also illustrated in this figure is the centrifugal impact diffuser configuration incorporated to incite inlet rotation. The shown embodiment subsumes wash orifice sets on tubular support members each set consisting of equal sized, coplanar, non-parallel though primarily opposing orifice.
Figure 22:
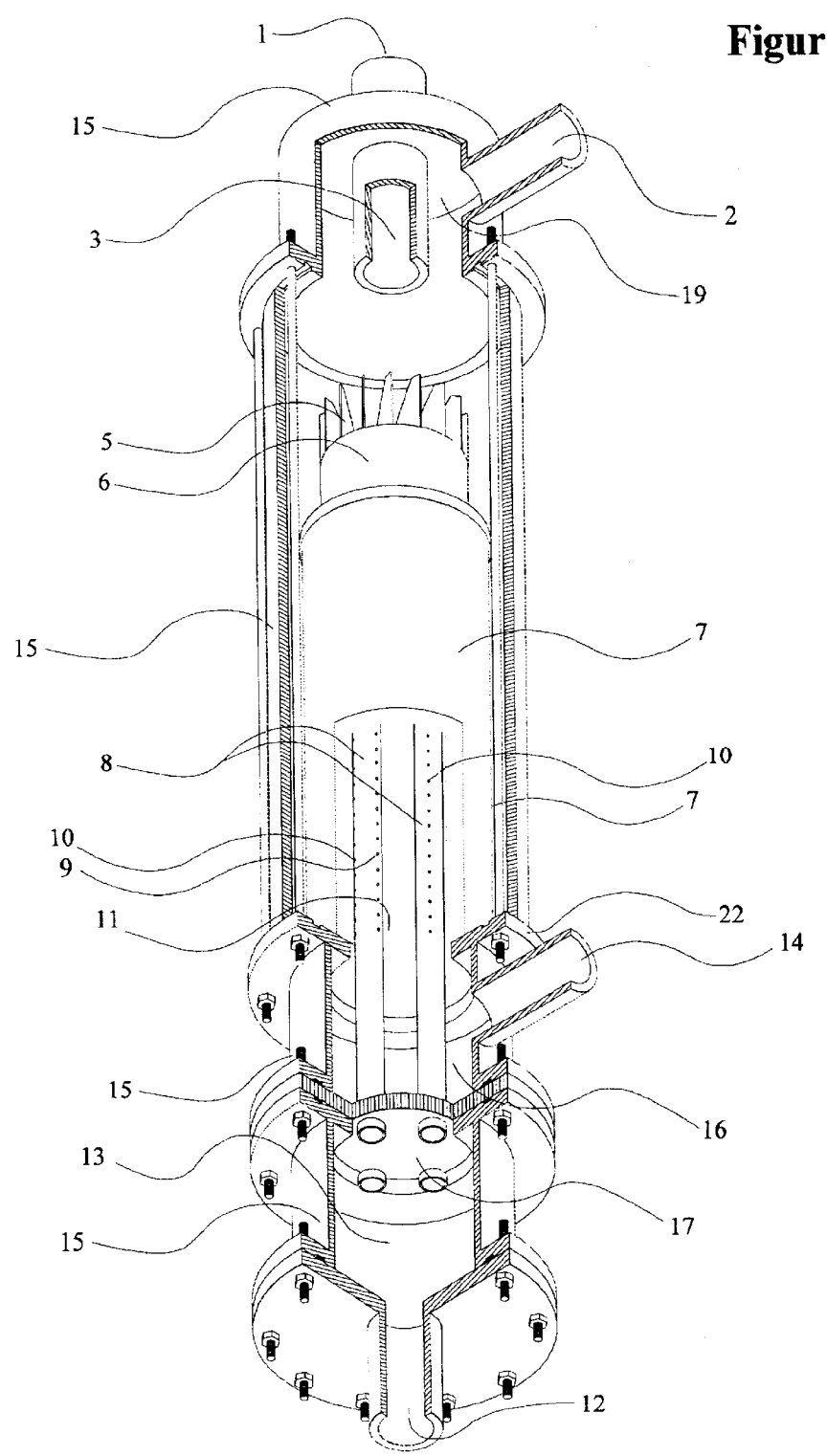
FIG. 22 is a bottom perspective view of an embodiment operating in the filtration mode. This figure illustrates the employment of the moveable plunger assembly wherein the moveable plunger is positioned to afford disk sealing and compression. In this embodiment, it is assumed that inlet and filtrate outlet valving occurs external to the filter body. Also illustrated in this figure is the centrifugal impact diffuser configuration incorporated to incite inlet rotation. The shown embodiment subsumes wash orifice sets on tubular support members each set consisting of equal sized, coplanar, non-parallel though primarily opposing orifice.

Description—FIGS. 21 and 22

Direct to obtaining the effect of the invention an embodiment, wherein inlet and filtrate outlet valves are external to the invention, operating in the filtration mode, is illustrated in perspective on FIG. 21 as an inclined to the upstream view and FIG. 22 as an inclined to the downstream view. Operational definition of the embodiment is as follows.

Unfiltered fluid is introduced under pressure into the filter body 15 via the inlet 1 of the invention. The unfiltered fluid travels through the inlet port 3 and discharges onto the moveable plunger 6. The unfiltered fluid impacts against the upstream end of the moveable plunger 6 and is impelled by the impact radially outward.

The swirling, unfiltered fluid passes through the annular space between the filter body 15 and the external surface of the filtration disks 7 stack. The upstream end of the filtration disks 7 stack is sealed by the backside of the moveable plunger 6 being in the opened inlet, filtration mode position. The downstream end of the filtration disks 7 stack is sealed by the disk support base 22. The fluid passes between the filtration disks 7 of the stack and accedes to the internal volume of the filtration disks 7 stack as a filtrate. The filtrate exits the disks 7 via the filtrate discharge port 11 and enters the filtrate plenum 19 for conveyance via the filtrate discharge outlet 14 to process.

Figure 23:
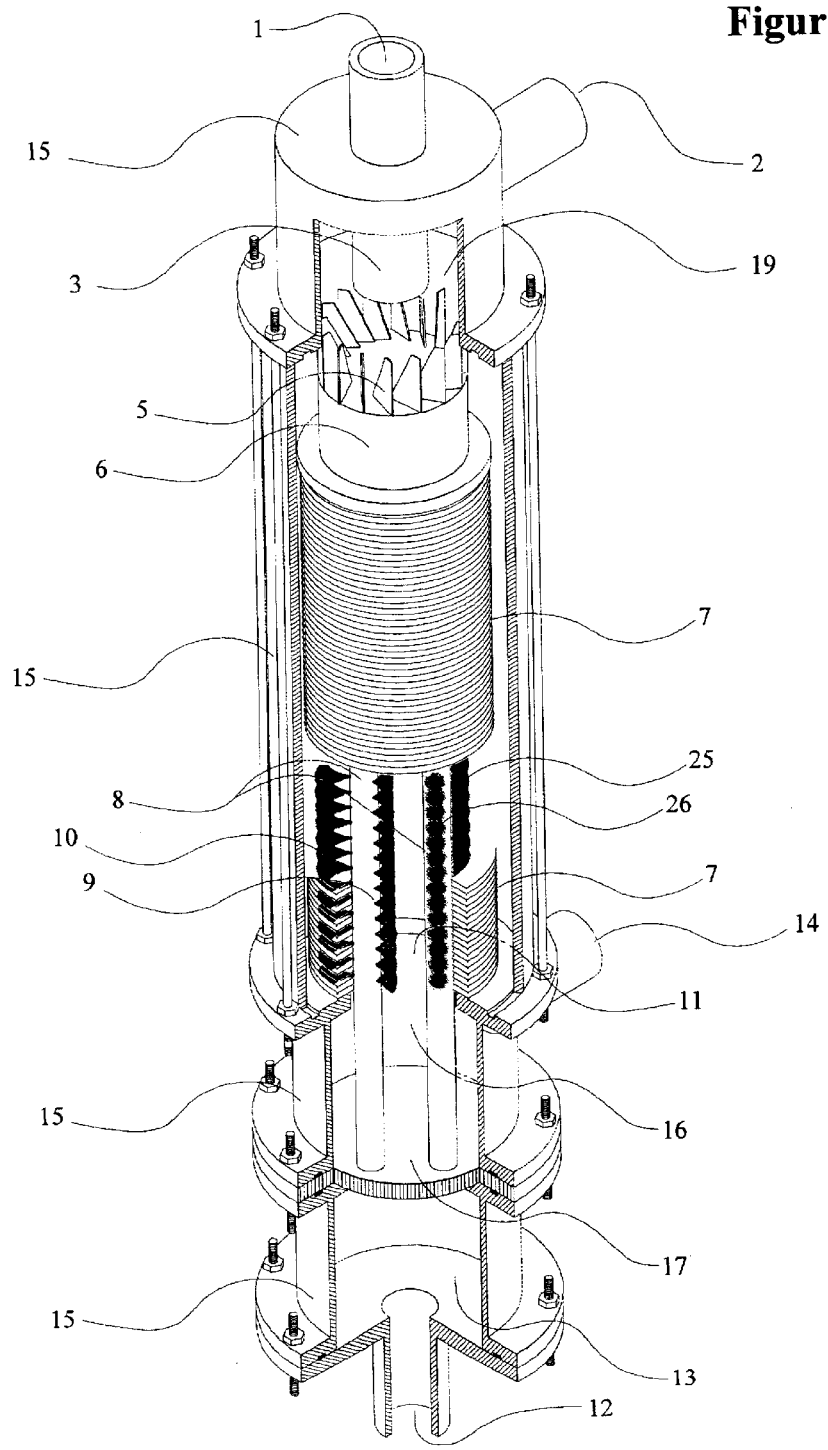
FIG. 23 is a top perspective view of an embodiment operating in the back flushing mode wherein high pressure back flushing fluid is introduced into the back flush receiver inlet on the downstream end of the filter. This figure illustrates the employment of the pressurized moveable plunger assembly wherein the moveable plunger is driven to decompress the filtration disks. In this embodiment, it is assumed that inlet and filtrate outlet valving occurs external to the filter body. Also illustrated in this figure is the centrifugal impact diffuser configuration incorporated to incite inlet rotation. The shown embodiment subsumes wash jet sets on tubular support members each set consisting of equal sized, coplanar, non-parallel though primarily opposing jets.
Figure 24:
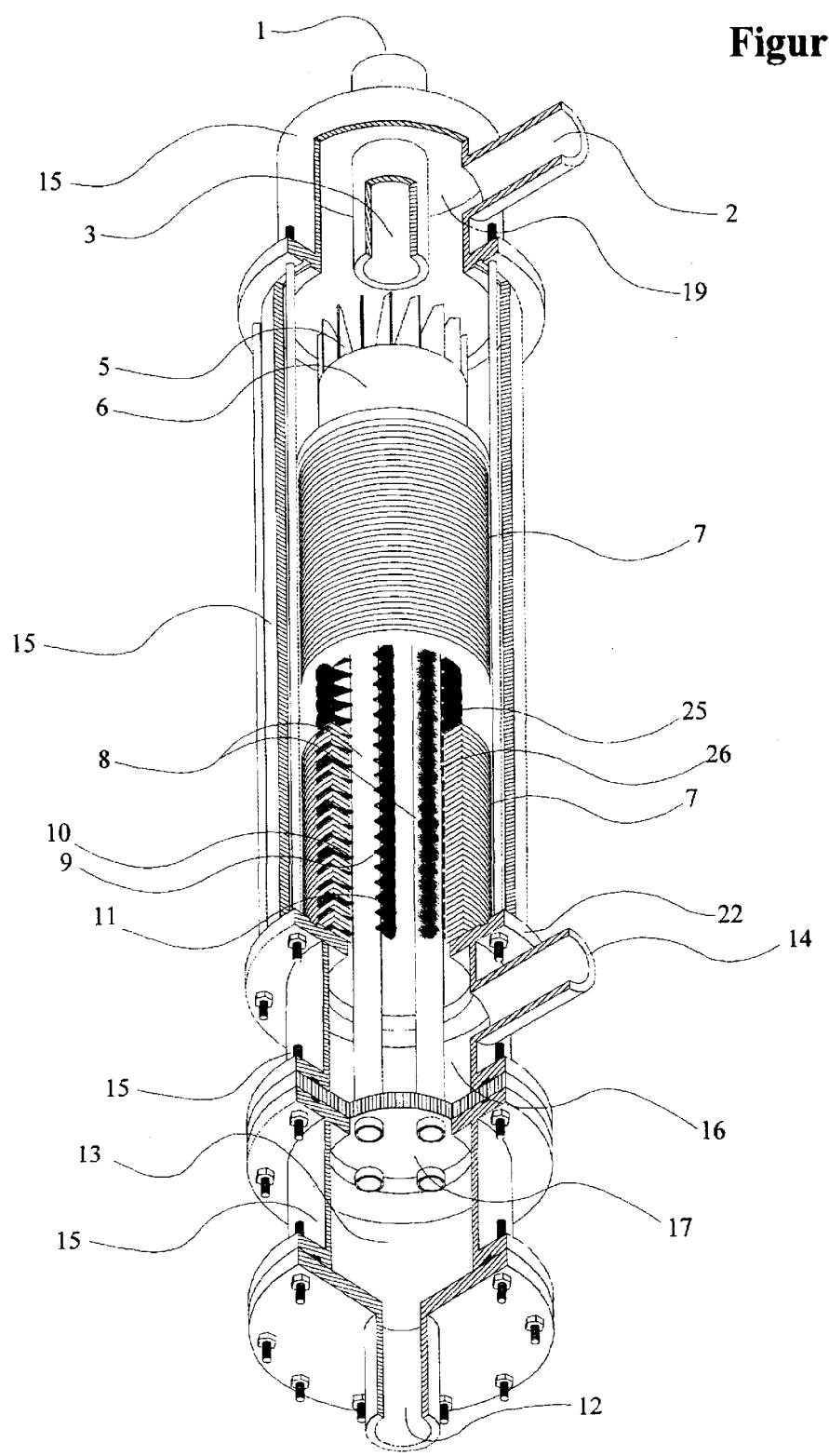
FIG. 24 is a bottom perspective view of an embodiment operating in the back flushing mode wherein high pressure back flushing fluid is introduced into the back flush receiver inlet on the downstream end of the filter. This figure illustrates the employment of the pressurized moveable plunger assembly wherein the moveable plunger is driven to decompress the filtration disks. In this embodiment, it is assumed that inlet and filtrate outlet valving occurs external to the filter body. Also illustrated in this figure is the centrifugal impact diffuser configuration incorporated to incite inlet rotation. The shown embodiment subsumes wash jet sets on tubular support members each set consisting of equal sized, coplanar, non-parallel though primarily opposing jets.

Description—FIGS. 23 and 24

Direct to obtaining the effect of the invention an embodiment, wherein inlet and filtrate outlet valves are external to the invention, operating in the filtration mode, is illustrated in perspective on FIG. 23 as an inclined to the upstream view and FIG. 24 as an inclined to the downstream view. Operational definition of the embodiment is as follows.

During the back flushing process, back flush medium is introduced under high pressure into the back flush receiver inlet. 12. The pressurized back flush medium enters through the filter body 15 and into the back flush receiver plenum chamber 13. The back flush medium exits the back flush receiver plenum 13 and enters the open ends of the hollow tubular support members 8. The high pressure back flush fluid is conveyed by means of the tubular support members 8 through the tubular support base 17, through the filtrate plenum chamber 19 and through the disk support base 22 and seal 18. The back flush fluid initially passes the orifice sets 9 and 10 and into the sealing plunger assembly 6. The pressure exerted by back flush fluid drives the sealing plunger 6 in the upstream direction compelling the sealing plunger 6 away from the filtration disk 7 stack, thereby releasing compression of the disks 7 of the stack in the axial direction. The back flush fluid pressurizes he internal tubular support members 8 generating a plurality of fluid jets 9a and 10a from the paired orifices 9 and 10 as coplanar, essentially equal velocity jets. These jets 9a and 10a impinge upon the released filter disks 7 and purvey a hydraulic scouring and cleaning action on the filter disk 7 surfaces. The back flush fluid jets 9a and 10a discharge across the filter disks 7 in nearly opposing directions. As a consequence, debris adhering to the disk 7 surfaces is impacted from different directions, thereby purveying an enhanced cleaning efficacy of the disks 7. Further, the slightly nonparallel opposite directions of the jets fluids 9a and 10a generate slightly unequal drag forces across the disk 7 surfaces. The back flush fluid jet 9a ejected from orifice 9 tends to drag the filter disks 7 in a right handed rotational direction. The back flush fluid jet 10a ejected from orifice 10 tends to drag the filter disks 7 in a left handed rotational direction. As a consequence of the slight variance from opposite of the impact angles of the of the two jets 9a and 10a upon the filter disk 7, a slight rotational motion is imparted to disk 7. This motion, in concert with the two nearly opposite impact angles of jets 9a and 10a, assure an essentially full 180 degree scouring action across the disk 7 surfaces which purveys superior cleaning efficiency. The slight variance from opposite of the impact angles of the two jets 9a and 10a is important to assure a slow rotational speed of the impacted disks 7. High rotational speed results in a detrimental variance of the relative velocity of impact between the two jets 9a and 10a and the disk 7. The effect of this variance is a bias of the cleaning efficiency of the jet impacting the disk 7 surface in an oncoming fashion relative to that of the jet impacting the disk 7 surface in a retreating fashion. Such bias reduces the overall disk 7 cleaning effectiveness.

The spent and solids laden back flush waste fluid exits external to the back flush disk 7 stack and is conveyed in the annular space between the external surface of the disk 7 stack and the internal surface of the filter body 15 to the waste discharge plenum 19 and then to the outlet for the solids laden discharge 2.

Figure 25:
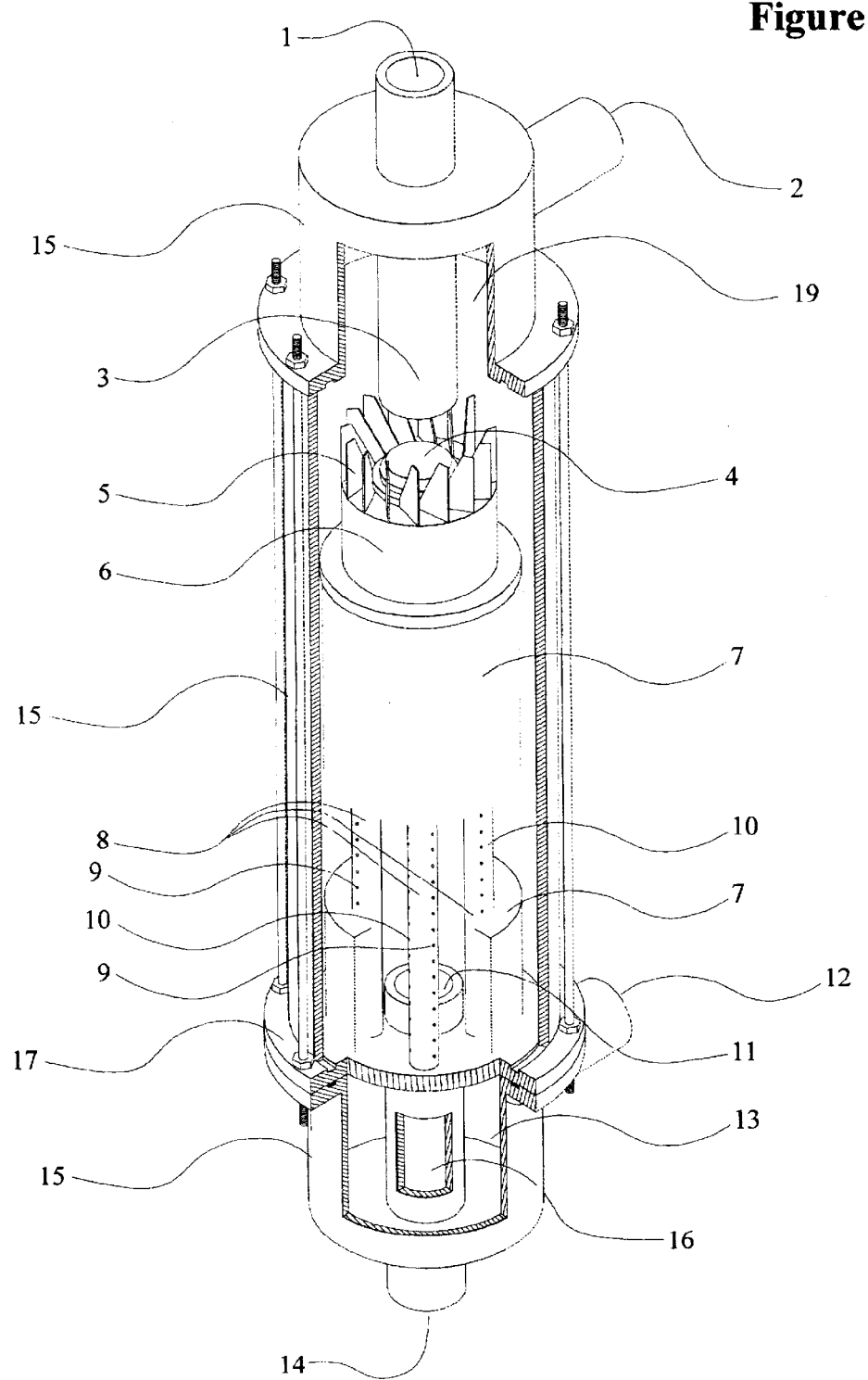
FIG. 25 is a top perspective view of an embodiment, showing a different geometrical configuration, operating in the filtration mode. This figure illustrates the employment of the moveable plunger assembly wherein the moveable plunger is positioned to afford inlet flow, disk sealing and compression. In this embodiment, it is assumed that filtrate outlet valving occurs external to the filter body. Also illustrated in this figure is the centrifugal impact diffuser configuration incorporated to incite inlet rotation. The shown embodiment subsumes wash orifice sets on tubular support members each set consisting of equal sized, coplanar, non-parallel though primarily opposing orifice.
Figure 26:
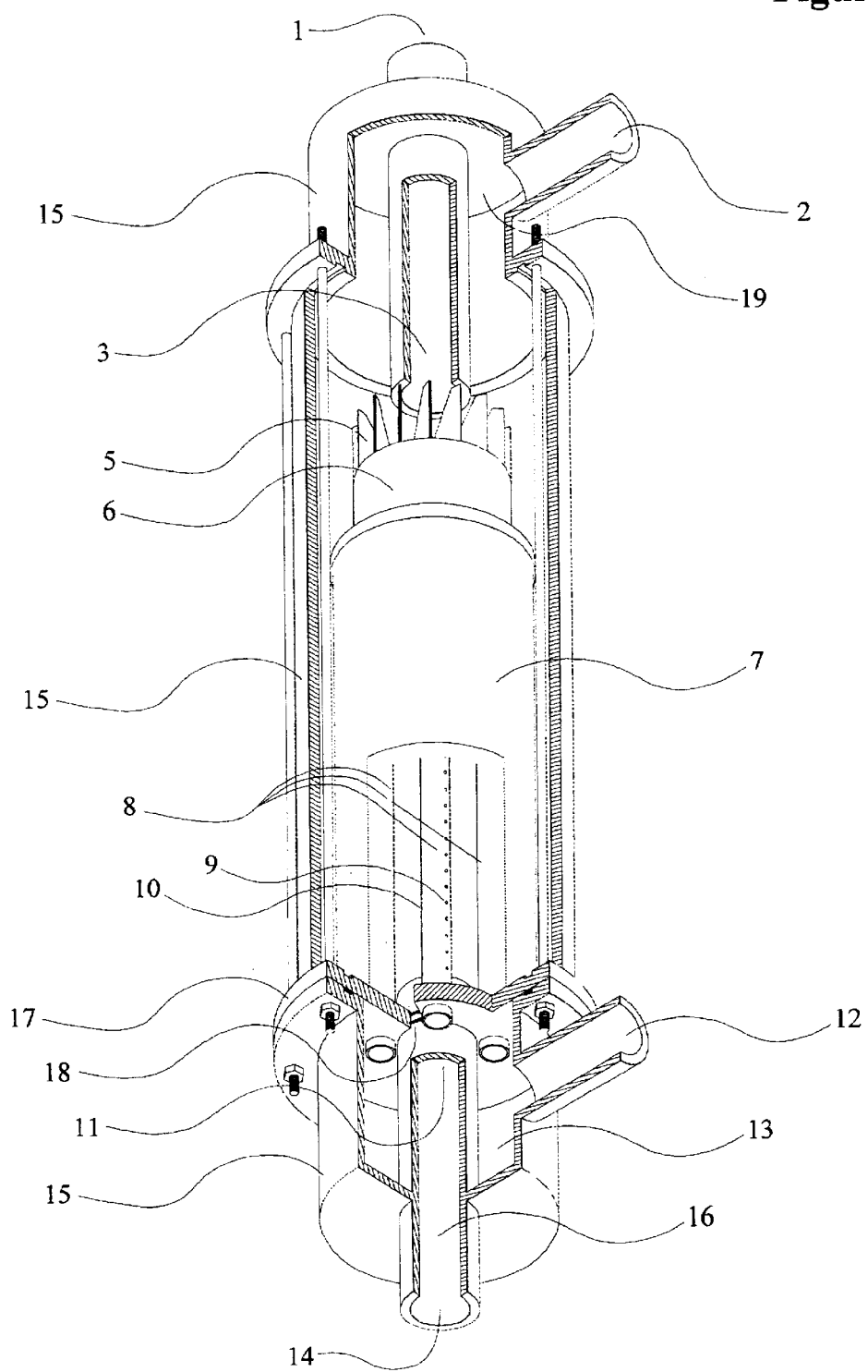
FIG. 26 is a bottom perspective view of an embodiment, showing a different geometrical configuration, operating in the filtration mode. This figure illustrates the employment of the moveable plunger assembly wherein the moveable plunger is positioned to afford inlet flow, disk sealing and compression. In this embodiment, it is assumed that filtrate outlet valving occurs external to the filter body. Also illustrated in this figure is the centrifugal impact diffuser configuration incorporated to incite inlet rotation. The shown embodiment subsumes wash orifice sets on tubular support members each set consisting of equal sized, coplanar, non-parallel though primarily opposing orifice.

Description—FIGS. 25 and 26

Direct to obtaining the effect of the invention an embodiment, employing a different geometrical configuration and where a filtrate outlet valve external to the invention is employed, operating in the filtration mode, is illustrated in perspective on FIG. 25 as an inclined to the upstream view and FIG. 26 as an inclined to the downstream view. Operational definition of the embodiment is as follows.

Unfiltered fluid is introduced under pressure into the filter body 15 via the inlet 1 of the invention. The unfiltered fluid travels through the inlet port 3 and discharges from the valve seat receiver end of the inlet tube 3 onto the inlet valve seat area 4 located on top of the moveable plunger 6. The unfiltered fluid impacts against the inlet valve seat area 4 and is impelled by the impact radially outward acquiring a swirl while passing through the turning vanes of the centrifugal inlet impeller 5.

The swirling, unfiltered fluid passes through the annular space between the filter body 15 and the external surface of the filtration disks 7 stack. The upstream end of the filtration disks 7 stack is sealed by the backside of the moveable plunger 6 being in the opened inlet, filtration mode position. The downstream end of the filtration disks 7 stack is sealed by the disk support base 22. The fluid passes between the filtration disks 7 of the stack and accedes to the internal volume of the filtration disks 7 stack as a filtrate. The filtrate exits the disks 7 via the filtrate discharge port and enters the filtrate plenum 19 for conveyance via the filtrate discharge outlet 14 to process.

Figure 27:
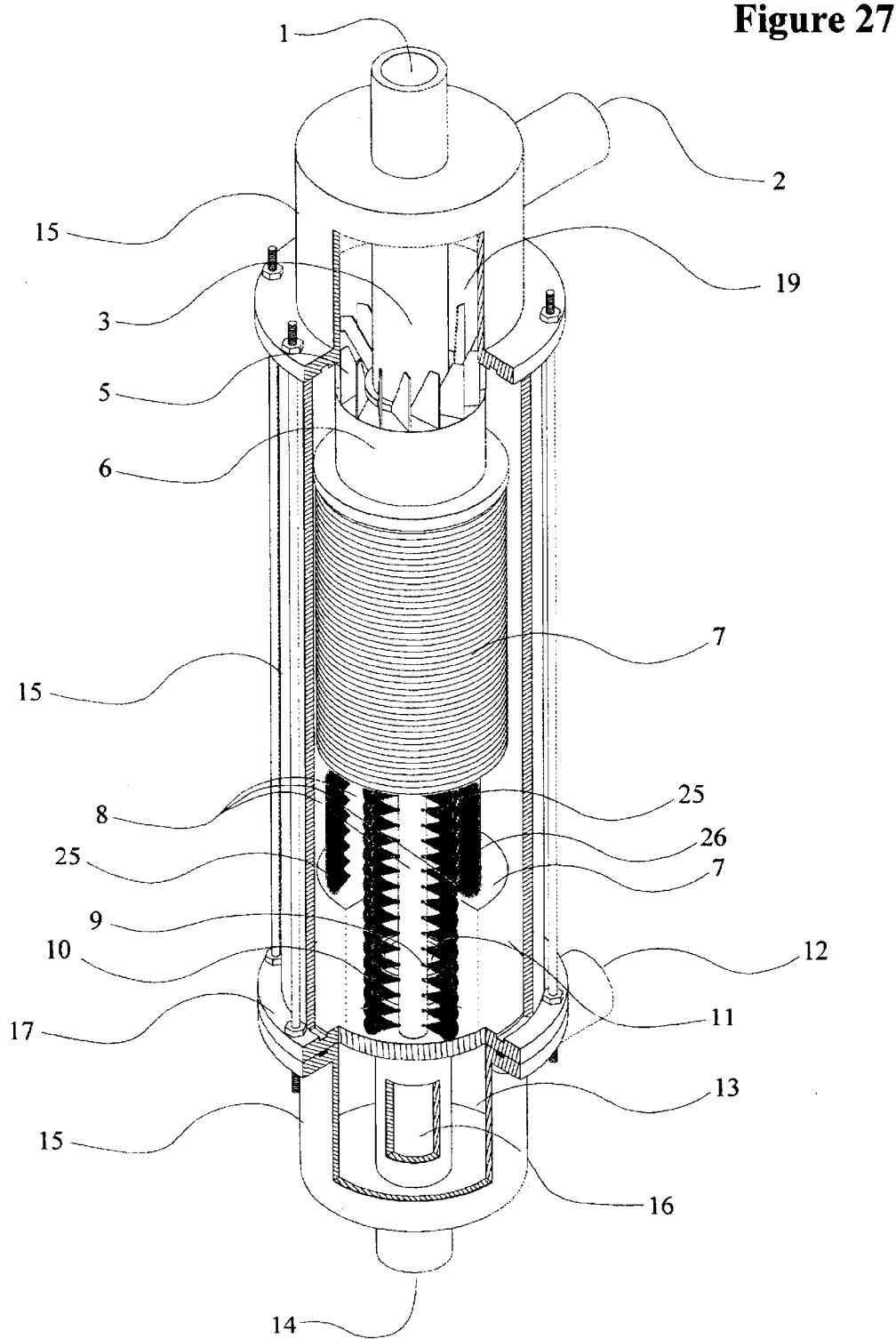
FIG. 27 is a top perspective view of an embodiment, showing a different geometrical configuration, operating in the back flushing mode wherein high pressure back flushing fluid is introduced into the back flush receiver inlet on the downstream end of the filter. This figure illustrates the employment of the pressurized moveable plunger assembly wherein the moveable plunger is driven to impede inlet flow and decompress the filtration disks. In this embodiment, it is assumed that filtrate outlet valving occurs external to the filter body. Also illustrated in this figure is the centrifugal impact diffuser configuration incorporated to incite inlet rotation. The shown embodiment subsumes wash jet sets on tubular support members each set consisting of equal sized, coplanar, non-parallel though primarily opposing jets.
Figure 28:
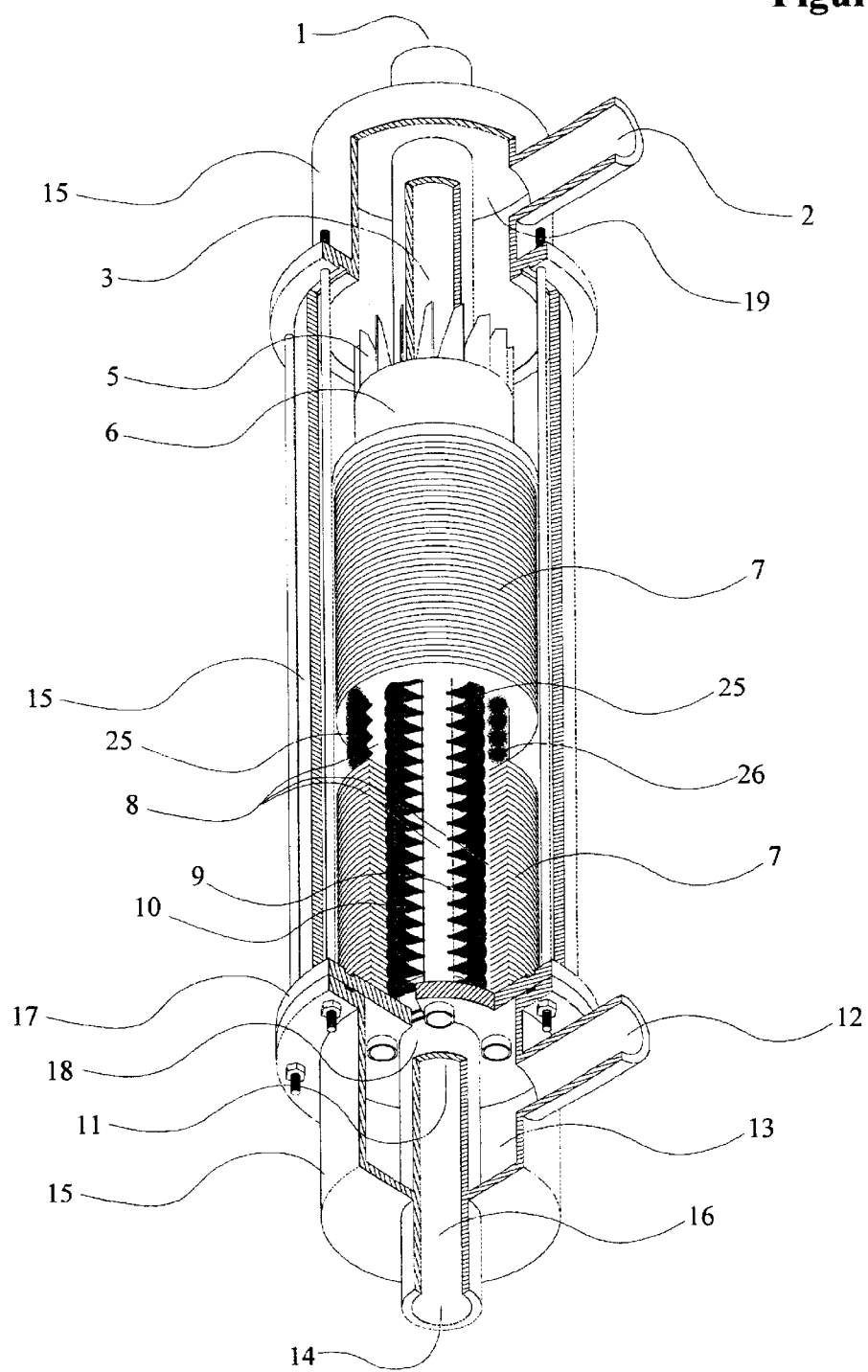
FIG. 28 is a bottom perspective view of an embodiment, showing a different geometrical configuration, operating in the back flushing mode wherein high pressure back flushing fluid is introduced into the back flush receiver inlet on the downstream end of the filter. This figure illustrates the employment of the pressurized moveable plunger assembly wherein the moveable plunger is driven to impede inlet flow and decompress the filtration disks. In this embodiment, it is assumed that filtrate outlet valving occurs external to the filter body. Also illustrated in this figure is the centrifugal impact diffuser configuration incorporated to incite inlet rotation. The shown embodiment subsumes wash jet sets on tubular support members each set consisting of equal sized, coplanar, non-parallel though primarily opposing jets.

Description—FIGS. 27 and 28

Direct to obtaining the effect of the invention an embodiment, employing a different geometrical configuration and where a filtrate outlet valve external to the invention is employed, operating in the back flush mode, is illustrated in perspective on FIG. 27 as an inclined to the upstream view and FIG. 28 as an inclined to the downstream view. Operational definition of the embodiment is as follows.

During the back flushing process, back flush medium is introduced under high pressure into the back flush receiver inlet. 12. The pressurized back flush medium enters through the filter body 15 and into the back flush receiver plenum chamber 13. The back flush medium exits the back flush receiver plenum 13 and enters the open ends of the hollow tubular support members 8. The high pressure back flush fluid is conveyed by means of the tubular support members 8 through the tubular support base 17, through the filtrate plenum chamber 19 and through the disk support base 22 and seal 18. The back flush fluid initially passes the orifice sets 9 and 10 and into the sealing plunger assembly 6. The pressure exerted by back flush fluid drives the sealing plunger 6 in the upstream direction compelling the plunger valve seat 4 onto the valve seat receiver end of the unfiltered inlet tube 3, effectively shutting off the unfiltered water supply from 1. Concurrent with this action, the backside of the sealing plunger assembly 6 moves away from the filtration disk 7 stack, thereby releasing compression of the disks 7 of the stack in the axial direction. The back flush fluid pressurizes the internal tubular support members 8 generating a plurality of fluid jets 9a and 10a from the paired orifices 9 and 10 as coplanar, essentially equal velocity jets. These jets 9a and 10a impinge upon the released filter disks 7 and purvey a hydraulic scouring and cleaning action on the filter disk 7 surfaces. The back flush fluid jets 9a and 10a discharge across the filter disks 7 in nearly opposing directions. As a consequence, debris adhering to the disk 7 surfaces is impacted from different directions, thereby purveying an enhanced cleaning efficacy of the disks 7. Further, the slightly nonparallel opposite directions of the jets fluids 9a and 10a generate slightly unequal drag forces across the disk 7 surfaces. The back flush fluid jet 9a ejected from orifice 9 tends to drag the filter disks 7 in a right handed rotational direction. The back flush fluid jet 10a ejected from orifice 10 tends to drag the filter disks 7 in a left handed rotational direction. As a consequence of the slight variance from opposite of the impact angles of the of the two jets 9a and 10a upon the filter disk 7, a slight rotational motion is imparted to disk 7. This motion, in concert with the two nearly opposite impact angles of jets 9a and 10a, assure an essentially full 180 degree scouring action across the disk 7 surfaces which purveys superior cleaning efficiency. The slight variance from opposite of the impact angles of the two jets 9a and 10a is important to assure a slow rotational speed of the impacted disks 7. High rotational speed results in a detrimental variance of the relative velocity of impact between the two jets 9a and 10a and the disk 7. The effect of this variance is a bias of the cleaning efficiency of the jet impacting the disk 7 surface in an oncoming fashion relative to that of the jet impacting the disk 7 surface in a retreating fashion. Such bias reduces the overall disk 7 cleaning effectiveness.

The spent and solids laden back flush waste fluid exits external to the back flush disk 7 stack and is conveyed in the annular space between the external surface of the disk 7 stack and the internal surface of the filter body 15 to the waste discharge plenum 19 and then to the outlet for the solids laden discharge 2.

Conclusion, Ramifications, and Scope

The knowledgeable reader will certainly appreciate the advantages of the invention in providing a filtration device of particularly substantial value for industrial applications. In contrast to the prior art, the reader will note that the invention provides industrial grade filtration service in an efficient, simple, reliable, geometrically compact and cost effective manner.

In contrast to the prior art, the reader will note that the invention provides the means for efficient filtration performance without the need for the troublesome and costly check valve, inlet valve and outlet valve apparatus. Further, the novel design permits the employment of high pressure back flushing with the option of using aggressive cleaning chemicals without the risk of pressure or chemically induced damage or failure to sensitive but critical check valves, inlet valves and outlet valves. Additionally, the knowledgeable reader will surely appreciate the advantage provided to the back flushing efficiency by means of the multidirectional orientation of the washing jet nozzles provided so as to impact and scour the disk filtration surfaces from varied directions thereby most efficiently lifting and removing adherent debris. Further, enhancement and improvement of the back flushing efficiency will be apparent to those knowledgeable in the art wherein a controlled, slower rotation of the disk surfaces, generated by the nearly opposing orientation of the wash jets, maximizes the relative impact velocity of the washing jet relative to the disk filtration surfaces. It should be further obvious that optimal scouring and cleaning effects are coincidental with the maximum relative impact velocity. Indeed, the advantages associated with the improved back flushing performance of the invention corresponds to reliable, efficient and cost effective filtration service in many difficult industrial applications.

The advantages over the prior art are substantial. Expensive, troublesome and inefficient industrial processes requiring filtration can be dramatically improved through employment of the invention. Further, new and novel processes, products or businesses, not previously feasible because of the performance limitations of the prior art, are made possible. The reader will also see that other advantages are inherent to the design and performance and filtration characteristics of the invention. Some of these additional advantages are:

The invention provides resolution of fundamental deficiencies inherent in the filtration performance and expense of the prior art. These deficiencies have had a detrimental effect upon the exploitation of disk filtration processes in industry.

In addition to providing superior filtration performance for industrial applications, the invention can also provide an improved disk filtration process for agricultural applications.

The invention affords a means to eliminate the fabrication expense, mechanical complexity and operational liabilities associated with the critical check valve assemblies of the prior art.

The invention eliminates the pressure drop and/or associated flow impediment accompanying the critical check valves of the prior art. Consequently the capital and operating costs as well as the pumping energy requirements of the invention are substantially less than that of the prior art.

The invention affords a means to eliminate the fabrication expense, mechanical complexity and operational liabilities associated with the inlet valve of the prior art.

The invention eliminates the pressure drop and/or associated flow impediment accompanying the inlet valve of the prior art. Consequently the capital and operating costs as well as the pumping energy requirements of the invention are substantially less than that of the prior art.

The invention eliminates the failures and associated downtime, labor and maintenance expense resulting from plugging and wedging of debris in the inlet valve of the prior art.

The invention permits the use of disk filtration for fluids in processes or industries where solids or debris would plug or wedge the inlet valve of the prior art.

The invention affords a means to eliminate the fabrication expense, mechanical complexity and operational liabilities associated with the outlet valve of those prior art applications where an external source supplies the back flushing fluids.

The invention eliminates the pressure drop and/or associated flow impediment accompanying the outlet valve of those prior art applications where an external source supplies the back flushing fluids. Consequently the capital and operating costs as well as the pumping energy requirements of the invention are substantially less than that of the prior art.

In contrast to the single jet orientation of the prior art, the substantially opposed back flush jets of the invention reduces the disk rotational speed while back flushing, thereby maximizing the relative impact velocity of the jets upon the disk surfaces and accordingly, optimizing the disk cleaning effectiveness. As a consequence, in comparison to the prior art, the invention provides a more efficient disk filtration service with a reduced back flushing frequency and accordingly less wear on the equipment as well as less back flush fluid and/or cleaning chemical waste to discharge.

In contrast to the prior art, the invention employs a balanced filtration flow across the filtration disk stack. The invention achieves this object with advantages given toward uniform distribution of flow and homogenous solids collection throughout the disk stack. The invention eliminates the disadvantage of the prior art wherein localized heavy deposits of solids collect upon the filtration stack. The invention provides the fruition of balanced filtration loading thereby purveying maximum flow rates at minimal pressures with optimal back flush cleaning performance.

In contrast to the prior art, the invention does not employ a check valve or use the filtrate outlet pressure for back flushing. Consequently much higher back flushing pressures can be employed to promote the most efficient back flush cleaning of the disks.

In contrast to the prior art, the invention provides a disk filtration apparatus in which chemicals may be employed to assist in back flush cleaning operations without concern of damage to, or malfunction of, the critical check valve assemblies of the prior art. In contrast to the prior art, processes, applications and fluids which require chemical cleaning of the disks can be successfully addressed by the invention.

In contrast to the prior art, through the employment of a novel, centerline configured centrifugal impact impeller, the invention can provide spin enhanced separation and filtration while also being centerline configured. Consequently the invention offers the solids separation advantage of imparted spin without hindering the simplicity, low cost and compact size provided by centerline piping.

The invention employs a novel centrifugal impact impeller rather the axial flow vanes of the prior art to incite the desired rotation of the unfiltered inlet water. The centrifugal vanes of invention are constrained within the inlet water stream in such a fashion as to be self cleaning in the flow direction of the inlet stream. Solids entrained back flush fluids are constrained to flow annularly around rather than through the centrifugal spin incitement vanes. In contrast to the axial vane approach of the prior art, the invention provides the advantage of rendering spin to the incoming unfiltered water stream in a manner which eliminates the vulnerability of the spin incitement blades becoming entwined or plugged with inlet or back flushed solids. Therefore, in contrast to the prior art, processes, fluids and applications for which spin separation is advantageous but for which the collected solids characteristics render disk filtration by the prior art unacceptable can be successfully serviced by the invention.

Although the foregoing description contains many examples and considerations, these should not be construed as limiting the scope of the invention but instead as affording examples and illustration of some of the preferred embodiments of this invention. For example there are many different configurations for the locations and orientations of inlets and outlets to the filter. Also there can be many porting and sealing configurations and orientations. Other possibilities which are meritably conceivable are those configurations wherein the back flush receiving plenums could provide a reaction chamber for mixing of two or more chemicals for cleaning or possibly for modifying the filtration elements in place. It also is conceivable that filtrate from the outlet port could, if provided enough pressure, be routed for use as a pressured back flush medium. It also is obvious from the invention that the plunger could be employed to operate one or more additional valves for filtration or other processes, this would be a simple and potentially beneficial ramification of invention.

Clearly, the scope, ramifications and potential of the invention are well beyond the discussions of this document and therefore the true scope and delineation of the invention must be determined by the appended claims and their legal equivalents, rather than the examples provided herein.

What is claimed is:

1. A self cleaning filtration device comprised of a body assemblage connected to a supply conveyance for raw product feed, a discharge conveyance for filtered product discharge, a cleaning media inlet conveyance and a spent media and waste debris outlet conveyance, the device being characterized to operate in filtering and cleaning modes and comprising:

a) a back flush washable filtration unit internal to the body assemblage and including a plurality of filtration elements;

b) an inlet port adapted to the supply conveyance for receiving the raw product feed;

c) an outlet port adapted to the discharge conveyance for discharging the filtered product discharge;

d) a plunger assembly having a sealing plunger and moveable to provide sealing together of the filtration elements and opening of the inlet and outlet ports of the device in a first position and release of the filtration elements and contact closing of the inlet and outlet ports in a second position;

e) a first structural bracing to support the sealing plunger;

f) a second structural bracing to support the filtration elements;

g) a back flush receiving plenum adapted to the cleaning media inlet conveyance, the back flush receiving plenum being hydraulically isolated from the discharge conveyance for the filter product discharge; and h) a pressure conveyance means extending between the back flush receiving plenum and the plunger assembly to provide the impetus for motion of the plunger assembly between the first and second positions, said pressure conveyance means further providing a direct conveyance means for delivering back flushing fluid from the back flush receiving plenum to a back flush receiving face of the filtration elements;

wherein the device is so configured that in a filtering mode, the back flush receiving plenum does not receive pressured cleaning media, thereby eliminating motive pressure to the plunger assembly and permitting the sealing plunger to rest in the first position thereby permitting the raw product feed into the body assemblage through the filtration elements and discharged from the body assemblage as product, wherein further, when cleaning of the filtration elements is necessary, cleaning media is conveyed, under pressure, into the back flush receiving plenum, thereby pressuring the back flush receiving plenum and the pressure conveyance means to thereby urge the plunger assembly into the second position wherein the filtration elements are released for cleaning and the inlet and outlet ports are closed, wherein further the pressured cleaning media in the back flush receiving plenum is conveyed to flushing contact with the filtration elements and eventual discharge from the body assemblage via the spent media and waste debris outlet discharge conveyance.

2. The self cleaning filtration device of claim 1 wherein a valve seat and sealing assembly is mechanically attached to the sealing plunger, wherein the mechanical attachment is so disposed as to facilitate a sealing contact relationship with a seal matching surface disposed about the raw feed inlet port, thereby closing said inlet port to flow when the sealing plunger is in the second position, but, being removed from said sealing contact and thereby permitting flow, when the plunger is in the first position.

3. The self cleaning filtration device of claim 1 wherein a valve seat and sealing assembly is mechanically connected to the sealing plunger, wherein the mechanical connection is so disposed as to facilitate a sealing contact relationship with a seal matching surface disposed about the filtrate outlet port, thereby closing said outlet port to flow, when the sealing plunger is in the second position, but being removed from said sealing contact, thereby permitting flow, when the plunger is in the first position.

4. The self cleaning filtration device of claim 1 wherein the spent back flush media and waste debris outlet conveyance includes an opening and closing control valve.

5. The self cleaning filtration device of claim 1 wherein the cleaning media inlet conveyance includes an opening and closing control valve.

6. The self-cleaning filtration device of claim 1 wherein the plurality of filtration elements is a stack of textured surface, hollow disks.

7. A self cleaning filtration device comprised of a body assemblage connected to a supply conveyance for raw product feed, a discharge conveyance for filtered product discharge, a cleaning media inlet conveyance and a spent media and waste debris outlet conveyance, the device being characterized to operate in filtering and cleaning modes and comprising:
   a) a back flush washable filtration unit internal to the body assemblage and including a plurality of filtration elements;
   b) an inlet port adapted to the supply conveyance for receiving the raw product feed;
   c) an outlet port adapted to the discharge conveyance for discharging the filtered product discharge;
   d) a plunger assembly having a sealing plunger and moveable to provide sealing together of the filtration elements and opening of the inlet and outlet ports of the device in a first position and release of the filtration elements and contact closing of the inlet and outlet ports in a second position;
   e) a first structural bracing to support the sealing plunger;
   f) a second structural bracing to support the filtration elements;
   g) a back flush receiving plenum adapted to the cleaning media inlet conveyance, the back flush receiving plenum being hydraulically isolated from the discharge conveyance for the filter product discharge;
   h) a pressure conveyance means extending between the back flush receiving plenum and the plunger assembly to provide the impetus for motion of the plunger assembly between the first and second positions, said pressure conveyance means further providing a direct conveyance means for delivering back flushing fluid from the back flush receiving plenum to a back flush receiving face of the filtration elements; and
   i) a direct conveyance disposed between the back flush receiving plenum and the back flush receiving face of the filtration elements, wherein back flush cleaning fluid is jetted onto the filtration elements by means of a plurality of distinct sets of substantially opposing spray jets;
   wherein the device is so configured that in a filtering mode, the back flush receiving plenum does not receive pressured cleaning media, thereby eliminating motive pressure to the plunger assembly and permitting the sealing plunger to rest in the first position thereby permitting the raw product feed into the body assemblage through the filtration elements and discharged from the body assemblage as product, wherein further, when cleaning of the filtration elements is necessary, cleaning media is conveyed, under pressure, into the back flush receiving plenum, thereby pressuring the back flush receiving plenum and the pressure conveyance means to thereby urge the plunger assembly into the second position wherein the filtration elements are released for cleaning and the inlet and outlet ports are closed, wherein further the pressured cleaning media in the back flush receiving plenum is conveyed via said jets to flushing contact with the filtration elements and eventual discharge from the body assemblage via the spent media and waste debris outlet discharge conveyance.

8. The self cleaning filtration device of claim 7 wherein a valve seat and sealing assembly is mechanically attached to the plunger, wherein the mechanical attachment is so disposed as to facilitate a sealing contact relationship with a seal matching surface disposed about the raw feed inlet port, thereby closing said inlet port to flow when the plunger is in the second position, but, being removed from said sealing and thereby permitting flow, when the is in the plunger first position.

9. The self cleaning filtration device of claim 7 wherein a valve and sealing assembly is mechanically connected to the plunger, wherein the mechanical connection is so disposed as to facilitate a sealing contact relationship with a seal matching surface disposed about the filtrate outlet port, thereby closing said outlet port to flow, when the plunger is in the second position, but being removed from said sealing contact, thereby permitting flow, when the plunger is in the first position.

10. The self cleaning filtration device of claim 7 wherein the spent back flush media and waste debris outlet conveyance includes an opening and closing control valve.

11. The self cleaning filtration device of claim 7 wherein the cleaning media inlet conveyance includes an opening and closing control valve.

12. The self-cleaning filtration device of claim 7 wherein the plurality of filtration elements is a stack of textured surface, hollow disks.

13. A self cleaning filtration device comprised of a body assemblage connected to a supply conveyance for raw product feed, a discharge conveyance for filtered product discharge, a cleaning media inlet conveyance and a spent media and waste debris outlet conveyance, the device being characterized to operate in filtering and cleaning modes and comprising:
   a) a back flush washable filtration unit internal to the body assemblage and including a plurality of filtration elements;
   b) an inlet port adapted to the supply conveyance for receiving the raw product feed;
   c) an outlet port adapted to the discharge conveyance for discharging the filtered product discharge;
   d) a plunger assembly having a sealing plunger and moveable to provide sealing together of the filtration elements and opening of the inlet and outlet ports of the device in a first position and release of the filtration elements and contact closing of the inlet and outlet ports in a second position;
   e) a first structural bracing to support the sealing plunger,
   f) a second structural bracing to support the filtration elements;
   g) a back flush receiving plenum adapted to the cleaning media inlet conveyance, the back flush receiving plenum being hydraulically isolated from the discharge conveyance for the filter product discharge;

h) a pressure conveyance means extending between the back flush receiving plenum and the plunger assembly to provide the impetus for motion of the plunger assembly between the first and second positions, said pressure conveyance means further providing a direct conveyance means for delivering back flushing fluid from the back flush receiving plenum to a back flush receiving face of the filtration elements;

i) a direct conveyance disposed between the back flush receiving plenum and the back flush receiving face of the filtration elements, wherein back flush cleaning fluid is jetted onto the filtration elements by means of a plurality of distinct sets of substantially opposing spray jets; and j) an impact radial diffusion impeller disposed opposite the inlet port to impart a spin upon the incoming raw product feed;

wherein the device is so configured that in a filtering mode, the back flush receiving plenum does not receive pressured cleaning media, thereby eliminating motive pressure to the plunger assembly and permitting the sealing plunger to rest in the first position thereby permitting the raw product feed into the body assemblage to impact the radial diffusion impeller and to flow through the filtration elements and discharged be from the body assemblage as product, wherein further, when cleaning of the filtration elements is necessary, cleaning media is conveyed, under pressure, into the back flush receiving plenum, thereby pressuring the back flush receiving plenum and the pressure conveyance means to thereby urge the plunger assembly into the second position wherein the filtration elements are released for cleaning and the inlet and outlet ports are closed, wherein further the pressured cleaning media in the back flush receiving plenum is conveyed via said jets to flushing contact with the filtration elements and eventual discharge from the body assemblage via the spent media and waste debris outlet discharge conveyance.

14. The self cleaning filtration device of claim 13 wherein a valve seat and sealing assembly is mechanically attached to the moveable plunger, wherein the mechanical attachment is so disposed as to facilitate a sealing contact relationship with a seal matching surface disposed about the raw feed inlet port, thereby closing said inlet port to flow when the moveable plunger is in the second position, but, being removed from said sealing contact and thereby permitting flow, when the plunger is in the first position.

15. The self cleaning filtration device of claim 13 wherein a valve and sealing assembly is mechanically connected to the sealing plunger, wherein the mechanical connection is so disposed as to provide facilitate a sealing contact relationship with a seal matching surface disposed upon about the filtrate outlet port, thereby closing said outlet port to flow when the moveable plunger is in the second position, but being removed from said sealing contact, thereby permitting flow, when the plunger is in the first position.

16. The self cleaning filtration device of claim 13 wherein the spent back flush media and waste debris outlet conveyance includes an opening and closing control valve.

17. The self cleaning filtration device of claim 13 wherein the spent back flush media and waste debris outlet convenience includes an opening and closing control valve.

18. The self-cleaning filtration device of claim 13 wherein the plurality of filtration elements is a stack of textured surface, hollow disks.

* * * * *